United States Patent
Malakapalli et al.

(10) Patent No.: US 12,164,796 B2
(45) Date of Patent: Dec. 10, 2024

(54) SYSTEMS AND METHODS FOR DATA COPY OFFLOAD FOR STORAGE DEVICES

(71) Applicant: Kioxia Corporation, Tokyo (JP)

(72) Inventors: Krishna Malakapalli, San Jose, CA (US); Jeremy Werner, San Jose, CA (US); Kenichi Iwai, Tokyo (JP)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 17/169,108

(22) Filed: Feb. 5, 2021

(65) Prior Publication Data
US 2022/0187992 A1 Jun. 16, 2022

Related U.S. Application Data

(60) Provisional application No. 63/126,442, filed on Dec. 16, 2020.

(51) Int. Cl.
G06F 12/00 (2006.01)
G06F 3/06 (2006.01)

(52) U.S. Cl.
CPC .......... G06F 3/065 (2013.01); G06F 3/0611 (2013.01); G06F 3/0656 (2013.01); G06F 3/0659 (2013.01); G06F 3/068 (2013.01)

(58) Field of Classification Search
CPC ...... G06F 3/065; G06F 3/0611; G06F 3/0656; G06F 3/0659; G06F 3/068
See application file for complete search history.

(56) References Cited

U.S. PATENT DOCUMENTS

| | | | |
|---|---|---|---|
| 6,757,762 B1* | 6/2004 | McCarthy | G06F 13/4059 710/310 |
| 6,904,474 B1* | 6/2005 | Robertson | G06F 15/17 710/316 |
| 9,929,829 B1* | 3/2018 | Huang | H04L 47/263 |
| 11,360,689 B1* | 6/2022 | Grunwald | G06F 11/1451 |
| 2007/0005833 A1* | 1/2007 | Seto | G06F 13/385 710/52 |
| 2008/0008202 A1* | 1/2008 | Terrell | H04L 49/10 370/401 |
| 2008/0147923 A1* | 6/2008 | Renahy | G06F 13/4059 710/62 |
| 2009/0089515 A1* | 4/2009 | Michalak | G06F 13/1668 711/154 |

(Continued)

FOREIGN PATENT DOCUMENTS

TW    200732955 A    9/2007

OTHER PUBLICATIONS

Office Action issued in corresponding Taiwanese Application No. 110146550 dated Nov. 9, 2022.

*Primary Examiner* — David Yi
*Assistant Examiner* — Tahilba O Puche
(74) *Attorney, Agent, or Firm* — Foley & Lardner LLP

(57) ABSTRACT

Various implementations described herein relate to systems and methods for transferring data from a source device to a destination device including receiving, by the destination device, a copy request from a host, performing, by the destination device, transfer with the source device to transfer data from buffers of the source device to buffers of the destination device, and writing, by the destination device, the data to a non-volatile storage of the destination device.

18 Claims, 12 Drawing Sheets

(56) References Cited

U.S. PATENT DOCUMENTS

| | | | |
|---|---|---|---|
| 2009/0219828 A1* | 9/2009 | Sharma | H04L 1/1685 370/252 |
| 2013/0007180 A1* | 1/2013 | Talpey | G06F 3/061 709/212 |
| 2016/0259739 A1* | 9/2016 | Woo | G06F 3/0632 |
| 2017/0308329 A1* | 10/2017 | A | G06F 3/0688 |
| 2018/0095915 A1* | 4/2018 | Prabhakar | H04L 67/1097 |
| 2019/0004964 A1* | 1/2019 | Kanno | G06F 3/065 |
| 2019/0065382 A1* | 2/2019 | Velayuthaperumal | G06F 3/065 |
| 2019/0146912 A1* | 5/2019 | Frolikov | G06F 12/0884 711/103 |
| 2020/0004701 A1* | 1/2020 | Subbarao | G06F 11/1068 |
| 2022/0035564 A1* | 2/2022 | Vikram Singh | G06F 3/061 |
| 2022/0035738 A1* | 2/2022 | Brandt | G06F 12/023 |

\* cited by examiner

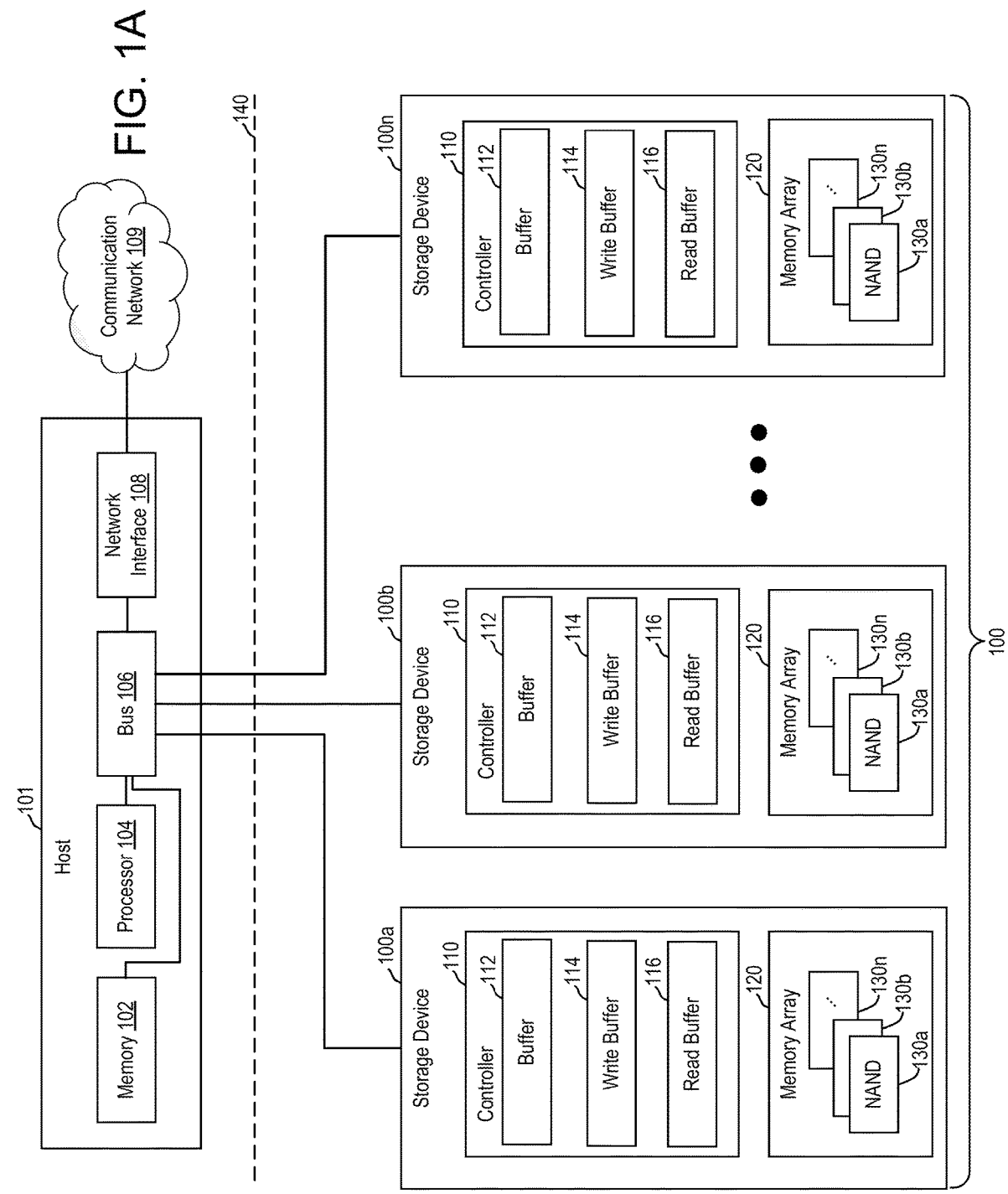

SYSTEMS AND METHODS FOR DATA COPY OFFLOAD FOR STORAGE DEVICES

CROSS-REFERENCE TO RELATED PATENT APPLICATIONS

This application claims priority to U.S. Provisional Patent Application Ser. No. 63/126,442, entitled "Systems and Methods for Data Copy Offload for Storage Devices" filed Dec. 16, 2020, the contents of which being hereby incorporated by reference in its entirety and for all purposes as if completely and fully set forth herein.

TECHNICAL FIELD

The present disclosure generally relates to systems, methods, and non-transitory processor-readable media for data copy in data storage devices.

BACKGROUND

In a traditional data copy process in which data is copied from a first Solid State Device (SSD) to a second SSD, a host sends a read command to the first SSD and transfers the data from the first SSD to a local memory of the host. Thereafter, the host sends a write command to the second SSD, and the data is transferred from the local memory of the host to the second SSD. Such a process require significant resources from the host to execute.

SUMMARY

In some arrangements, a method for transferring data from a source device to a destination device includes receiving, by the destination device, a copy request from a host, performing, by the destination device, transfer with the source device to transfer the data from buffers of the source device to buffers of the destination device, and writing, by the destination device, the data to a non-volatile storage of the destination device.

In some arrangements, a method for transferring data from a source device to a destination device includes communicating by the source device with the destination device to set up filling of buffers of the source device, and performing, by the source device, transfer with the destination device to transfer the data from buffers of the source device to buffers of the destination device.

BRIEF DESCRIPTION OF THE FIGURES

FIG. 1A shows a block diagram of examples of a system including storage devices and a host, according to some implementations.

DETAILED DESCRIPTION

Figure 1B:
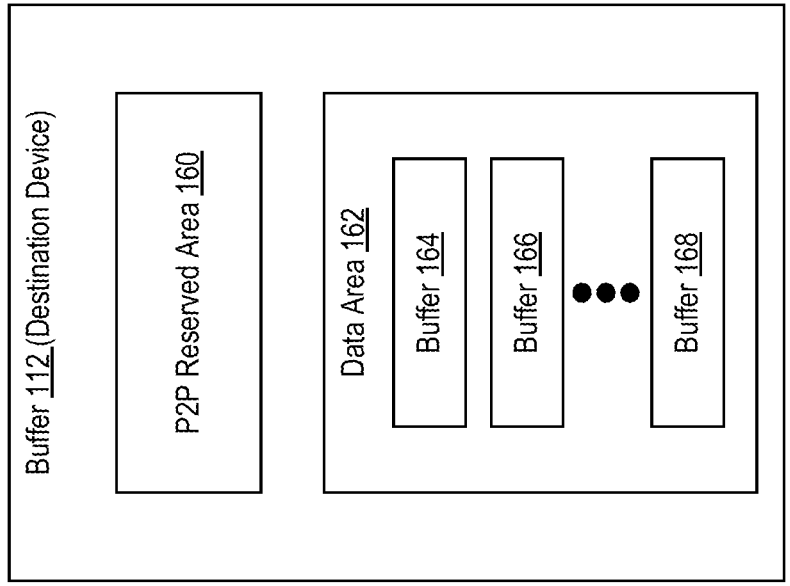
FIG. 1B shows a block diagram of examples of a buffer of a source device and a buffer of a destination device, according to some implementations.

The arrangements disclosed herein relate to data copy schemes that are cost-effective solutions without compromising the need to deliver to business needs faster. The present disclosure improves data copy while creating solutions that are in tune with the current system architecture and evolving changes. In some arrangements, the present disclosure relates to cooperatively performing data copy operations between two or more elements of a storage system. The data copy operations take place directly between the 2 or more elements of the storage system, without involving any third party (such as but not limited to, a storage system controller or host computer) in the copying of data, thus relieving, or "offloading" the third party of command, control or data buffering tasks. While non-volatile memory devices are presented as examples herein, the disclosed schemes can be implemented on any storage system or device that is connected over an interface to a host and temporarily or permanently stores data for the host for later retrieval.

To assist in illustrating the present implementations, FIG. 1A shows a block diagram of a system including storage devices 100a, 100b, 100n (collectively, storage devices 100) coupled to a host 101 according to some examples. The host 101 can be a user device operated by a user or an autonomous central controller of the storage devices, where the host 101 and storage devices 100 correspond to a storage subsystem or storage appliance. The host 101 can be connected to a communication network 109 (via the network interface 108) such that other host computers (not shown) may access the storage subsystem or storage appliance via the communication network 109. Examples of such a storage subsystem or appliance include an All Flash Array (AFA) or a Network Attached Storage (NAS) device. As shown, the host 101 includes a memory 102, a processor 104, and a bus 106. The processor 104 is operatively coupled to the memory 102 and the bus 106. The processor 104 is sometimes referred to as a Central Processing Unit (CPU) of the host 101, and configured to perform processes of the host 101.

The memory 102 is a local memory of the host 101. In some examples, the memory 102 is or a buffer, sometimes referred to as a host buffer. In some examples, the memory 102 is a volatile storage. In other examples, the memory 102 is a non-volatile persistent storage. Examples of the memory 102 include but are not limited to, Random Access Memory (RAM), Dynamic Random Access Memory (DRAM), Static RAM (SRAM), Magnetic RAM (MRAM), Phase Change Memory (PCM), and so on.

The bus 106 includes one or more of software, firmware, and hardware that provide an interface through components of the host 101 can communicate. Examples of components include but are not limited to, the processor 104, network cards, storage devices, the memory 102, graphic cards, and so on. In addition, the host 101 (e.g., the processor 104) can communicate with the storage devices 100 using the bus 106. In some examples, the storage devices 100 are directly attached or communicably coupled to the bus 106 over a suitable interface 140. The bus 106 is one or more of a serial, a PCIe bus or network, a PCIe root complex, an internal PCIe switch, and so on.

The processor 104 can execute an Operating System (OS), which provides a filesystem and applications which use the filesystem. The processor 104 can communicate with the storage devices 100 (e.g., a controller 110 of each of the storage devices 100) via a communication link or network. In that regard, the processor 104 can send data to and receive data from one or more of the storage devices 100 using the interface 140 to the communication link or network. The interface 140 allows the software (e.g., the filesystem) running on the processor 104 to communicate with the storage devices 100 (e.g., the controllers 110 thereof) via the bus 106. The storage devices 100 (e.g., the controllers 110 thereof) are operatively coupled to the bus 106 directly via the interface 140. While the interface 140 is conceptually shown as a dashed line between the host 101 and the storage devices 100, the interface 140 can include one or more controllers, one or more physical connectors, one or more data transfer protocols including namespaces, ports, transport mechanism, and connectivity thereof. While the connection between the host 101 and the storage devices 100 is shown as a direct link, in some implementations the link may comprise a network fabric which may include networking components such as bridges and switches.

To send and receive data, the processor 104 (the software or filesystem run thereon) communicates with the storage devices 100 using a storage data transfer protocol running on the interface 140. Examples of the protocol include but is not limited to, the SAS, Serial ATA (SATA), and NVMe protocols. In some examples, the interface 140 includes hardware (e.g., controllers) implemented on or operatively coupled to the bus 106, the storage devices 100 (e.g., the controllers 110), or another device operatively coupled to the bus 106 and/or the storage device 100 via one or more suitable networks. The interface 140 and the storage protocol running thereon also includes software and/or firmware executed on such hardware.

In some examples the processor 104 can communicate, via the bus 106 and the network interface 108, with the communication network 109. Other host systems (not shown) attached or communicably coupled to the communication network 109 can communicate with the host 101 using a suitable network storage protocol, examples of which include, but are not limited to, NVMe over Fabrics (NVMeoF), iSCSI, Fiber Channel (FC), Network File System (NFS), Server Message Block (SMB), and so on. The network interface 108 allows the software (e.g., the storage protocol or filesystem) running on the processor 104 to communicate with the external hosts attached to the communication network 109 via the bus 106. In this manner, network storage commands may be issued by the external hosts and processed by the processor 104, which can issue storage commands to the storage devices 100 as needed. Data can thus be exchanged between the external hosts and the storage devices 100 via the communication network 109. In this example, any data exchanged is buffered in the memory 102 of the host 101.

In some examples, the storage devices 100 are located in a datacenter (not shown for brevity). The datacenter may include one or more platforms or rack units, each of which supports one or more storage devices (such as but not limited to, the storage devices 100). In some implementations, the host 101 and storage devices 100 together form a storage node, with the host 101 acting as a node controller. An example of a storage node is a Kioxia Kumoscale storage node. One or more storage nodes within a platform are connected to a Top of Rack (TOR) switch, each storage node connected to the TOR via one or more network connections, such as Ethernet, Fiber Channel or InfiniBand, and can communicate with each other via the TOR switch or another suitable intra-platform communication mechanism. In some implementations, storage devices 100 may be network attached storage devices (e.g. Ethernet SSDs) connected to the TOR switch, with host 101 also connected to the TOR switch and able to communicate with the storage devices 100 via the TOR switch. In some implementations, at least one router may facilitate communications among the storage devices 100 in storage nodes in different platforms, racks, or cabinets via a suitable networking fabric. Examples of the storage devices 100 include non-volatile devices such as but are not limited to, Solid State Drive (SSDs), Ethernet attached SSDs, a Non-Volatile Dual In-line Memory Modules (NVDIMMs), a Universal Flash Storage (UFS), a Secure Digital (SD) devices, and so on.

Each of the storage devices 100 includes at least a controller 110 and a memory array 120. Other components of the storage devices 100 are not shown for brevity. The memory array 120 includes NAND flash memory devices 130a-130n. Each of the NAND flash memory devices 130a-130n includes one or more individual NAND flash dies, which are NVM capable of retaining data without power. Thus, the NAND flash memory devices 130a-130n refer to multiple NAND flash memory devices or dies within the flash memory device 100. Each of the NAND flash memory devices 130a-130n includes one or more dies, each of which has one or more planes. Each plane has multiple blocks, and each block has multiple pages.

While the NAND flash memory devices 130a-130n are shown to be examples of the memory array 120, other examples of non-volatile memory technologies for implementing the memory array 120 include but are not limited to, non-volatile (battery-backed) DRAM, Magnetic Random Access Memory (MRAM), Phase Change Memory (PCM), Ferro-Electric RAM (FeRAM), and so on. The arrangements described herein can be likewise implemented on memory systems using such memory technologies and other suitable memory technologies.

Examples of the controller 110 include but are not limited to, an SSD controller (e.g., a client SSD controller, a datacenter SSD controller, an enterprise SSD controller, and so on), a UFS controller, or an SD controller, and so on.

The controller 110 can combine raw data storage in the plurality of NAND flash memory devices 130a-130n such that those NAND flash memory devices 130a-130n function logically as a single unit of storage. The controller 110 can include processors, microcontrollers, buffers (e.g., buffer 112, 114, 116), error correction systems, data encryption systems, Flash Translation Layer (FTL) and flash interface modules. Such functions can be implemented in hardware, software, and firmware or any combination thereof. In some arrangements, the software/firmware of the controller 110 can be stored in the memory array 120 or in any other suitable computer readable storage medium.

The controller 110 includes suitable processing and memory capabilities for executing functions described herein, among other functions. As described, the controller 110 manages various features for the NAND flash memory devices 130a-130n including but not limited to, I/O handling, reading, writing/programming, erasing, monitoring, logging, error handling, garbage collection, wear leveling, logical to physical address mapping, data protection (encryption/decryption, Cyclic Redundancy Check (CRC)), Error Correction Coding (ECC), data scrambling, and the like. Thus, the controller 110 provides visibility to the NAND flash memory devices 130a-130n.

The buffer memory 111 is a memory device local to operatively coupled to the controller 110. For instance, the buffer memory 111 can be an on-chip SRAM memory located on the chip of the controller 110. In some implementations, the buffer memory 111 can be implemented using a memory device of the storage device 110 external to the controller 110. For instance, the buffer memory 111 can be DRAM located on a chip other than the chip of the controller 110. In some implementations, the buffer memory 111 can be implemented using memory devices both internal and external to the controller 110 (e.g., both on and off the chip of the controller 110). For example, the buffer memory 111 can be implemented using both an internal SRAM and an external DRAM, which are transparent/exposed and accessible by other devices via the interface 140, such as the host 101 and other storage devices 100. In this example, the controller 110 includes an internal processor that uses memory addresses within a single address space and the memory controller, which controls both the internal SRAM and external DRAM, selects whether to place the data on the internal SRAM and an external DRAM based on efficiency. In other words, the internal SRAM and external DRAM are addressed like a single memory. As shown, the buffer memory 111 includes the buffer 112, the write buffer 114, and the read buffer 116. In other words, the buffer 112, the write buffer 114, and the read buffer 116 can be implemented using the buffer memory 111.

The controller 110 includes a buffer 112, which is sometimes referred to as a drive buffer or a Controller Memory Buffer (CMB). Besides being accessible by the controller 110, the buffer 112 is accessible by other devices via the interface 140, such as the host 101 and other ones of the storage devices 100. In that manner, the buffer 112 (e.g., addresses of memory locations within the buffer 112) is exposed across the bus 106 and devices on the bus 106 may issue read and write commands using addresses which correspond to memory locations within the buffer 112 or logical addresses (e.g., Logical Block Address (LBAs)) in order to read and write data within the buffer. In some examples, the buffer 112 is a volatile storage. In some examples, the buffer 112 is a non-volatile persistent storage. Examples of the buffer 112 include but are not limited to, RAM, DRAM, SRAM, MRAM, PCM, and so on. The buffer 112 may refer to multiple buffers each configured to store data of a different type, as described herein.

In some implementations, as shown in FIG. 1A, the buffer 112 is a local memory of the controller 110. For instance, the buffer 112 can be an on-chip SRAM memory located on the chip of the controller 110. In some implementations, the buffer 112 can be implemented using a memory device of the storage device 110 external to the controller 110. For instance, the buffer 112 can be DRAM located on a chip other than the chip of the controller 110. In some implementations, the buffer 112 can be implemented using memory devices both internal and external to the controller 110 (e.g., both on and off the chip of the controller 110). For example, the buffer 112 can be implemented using both an internal SRAM and an external DRAM, which are transparent/exposed and accessible by other devices via the interface 140, such as the host 101 and other storage devices 100. In this example, the controller 110 includes an internal processor uses memory addresses within a single address space and the memory controller, which controls both the internal SRAM and external DRAM, selects whether to place the data on the internal SRAM and an external DRAM based on efficiency. In other words, the internal SRAM and external DRAM are addressed like a single memory.

In one example concerning a write operation, in response to receiving data from the host 101 (via the host interface 140), the controller 110 acknowledges the write commands to the host 101 after writing the data to a write buffer 114. In some implementations the write buffer 114 may be implemented in a separate, different memory than the buffer 112, or the write buffer 114 may be a defined area or part of the memory comprising buffer 112, where only the CMB part of the memory is accessible by other devices, but not the write buffer 114. The controller 110 can write the data stored in the write buffer 114 to the memory array 120 (e.g., the NAND flash memory devices 130a-130n). Once writing the data to physical addresses of the memory array 120 is complete, the FTL updates mapping between logical addresses (e.g., LBAs) used by the host 101 to associate with the data and the physical addresses used by the controller 110 to identify the physical locations of the data. In another example concerning a read operation, the controller 110 includes another buffer 116 (e.g., a read buffer) different from the buffer 112 and the buffer 114 to store data read from the memory array 120. In some implementations the read buffer 116 may be implemented in a separate, different memory than the buffer 112, or the read buffer 116 may be a defined area or part of the memory comprising buffer 112, where only the CMB part of the memory is accessible by other devices, but not the read buffer 116.

While non-volatile memory devices (e.g., the NAND flash memory devices 130a-130n) are presented as examples herein, the disclosed schemes can be implemented on any storage system or device that is connected to the host 101 over an interface, where such system temporarily or permanently stores data for the host 101 for later retrieval.

While the storage devices 100 are shown and described as separate physical devices, the arrangements disclosed herein are likewise applicable to storage devices 100 that are virtualized. For instance, the controller 110 and the memory array 120 of each of the storage devices 100 can be virtualized from hardware components such as processors and memories.

Traditionally, in order to copy data corresponding to one logical address (e.g., one LBA), or more usually a range of logical addresses (e.g., a range of LBAs, specified using a start LBA and a length B of data bytes to transfer), from a first storage device (e.g., the storage device 100a) to a second storage device (e.g., the storage device 100b), the host 101 needs to allocate a buffer in the memory 102 and send an I/O command (e.g., a read command) via the interface 140 and the bus 106 to the first storage device to read data corresponding to the logical address, providing the address of the memory 102, a source LBA and data length B as parameters in the read command. The storage device 100*a* translates the logical address to a physical address, reads B data bytes from the memory array 120 at the physical address into the read buffer 116. Having read all the data corresponding to the B data bytes, the controller 110 transfers the B bytes of data (typically using a direct memory transfer operation on the bus 106) from read buffer 116 in the first storage device via the interface 140 and the bus 106 to the allocated buffer in the memory 102. Finally, the controller 110 indicates to the host 101 that the read command has completed without error. The host 101 sends another I/O command (e.g., a write command) to the second device via the interface 140 and the bus 106, providing the address of the buffer in the memory 102, a destination LBA and length B as command parameters. As a response to the second I/O command, the controller 110 transfers the data (typically using a direct memory transfer operation on the bus 106) from the allocated buffer in the memory 102 to the write buffer 114. Then, the controller 110 performs a translation of the destination LBA to a physical address and transfers B bytes of data from write buffer 114 to the physical address in the memory array 120 of the second storage device via the interface 140 and the bus 106. A contiguous block of data can be transferred by specifying a range of LBAs using a start LBA and a length value, indicating the size of the block of data. In addition, using storage protocols such as NVMe, a set of non-contiguous blocks of data may be specified using a list (e.g., a Scatter-Gather List (SGL)) of LBAs and length pairs. In this case, the aforementioned process is repeated for each LBA and length pair of the list until data for all the blocks of data has been copied.

All such operations require CPU cycles, Context Switches, and so on, on the processor 104 of the host 101. In addition, the transfer performed between the processor 104 and the memory 102 consumes memory space (data buffers, Submission Queues (SQs)/Completion Queues (CQs)), and memory bus bandwidth between the processor 104 and the memory 102. Still further, the communication of data between the processor 104 and the bus 106 consumes bandwidth of the bus 106, where the bandwidth of the bus 106 is considered a precious resource because the bus 106 serves as an interface among the different components of the host 101, as well as the storage devices 100*a*, 100*b* . . . 100*n* themselves. Accordingly, the traditional data copy scheme consume considerable resources (e.g., bandwidth, CPU cycles, and buffer space) on the host 101.

Some arrangements disclosed herein relate to achieving data copy based on Peer-to-Peer (P2P) transfers among the storage devices 100. In a data copy scheme using P2P transfers, the local memory buffers (e.g., the buffers 112) of the storage devices 100 are used to perform data transfers from one storage device (e.g., the storage device 100*a*) to another (e.g., the storage device 100*b*). Data copying involving multiple storage devices 100 can be performed among the storage devices 100 without involvement from the host 101 aside from the host 101 triggering the data copy operation by sending one I/O command to the first one (e.g., the storage device 100*a*) of the more than two storage devices 100. Accordingly, data no longer needs to be copied into the memory 102 of the host 101, thus reducing latency and bandwidth needed to transfer data into and out of the memory 102. The number of I/O operations can be reduced to one I/O for a copy operation involving a range of logical addresses and a significant number of storage devices 100. The efficiency gain not only improves performance but also reduces cost, power consumption, and network utilization.

To achieve such improved efficiencies, the address of the buffer 112 of each of the storage devices 100 is shared with all of the storage devices 100, such that each of the storage devices 100 is aware of the addresses of the buffers 112 of the other storage devices 100. For example, the storage device 100*a* is aware of the address of the buffer 112 of each of the storage devices 100*b*-100*n*, the storage device 100*b* is aware of the address of the buffer 112 of each of the storage devices 100*a*, 100*c*-100*n*, the storage device 100*n* is aware of the address of the buffer 112 of each of the storage devices 100*a*-100*n*-1, and so on.

The addresses of the buffers 112 of the storage devices 100 be shared in using various mechanisms. In some implementations, each of the storage devices 100 can obtain the addresses of the buffers 112 of other storage devices 100 from a designated entity, or the addresses of the buffers 112 are stored in a shared address register. For example, the addresses of the buffers 112 of the storage devices 100 can exposed across the bus 106 (e.g., through a Base Address Register) to the host 101 to be shared with the storage devices 100. An examples of the Base Address Register is a shared PCIe Base Address Register, which is a shared address register and a designated entity. The address of a buffer 112 that is a CMB can be, for example, a NVMe controller register CMBLOC, which includes the PCI address location of the start of the buffer 112 (the start of the buffer 112) and a controller register CMBSZ (the size of the buffer 112).

In another example, the addresses of the buffers 112 can be managed and provided by another suitable entity with suitable processing and memory capabilities (e.g., having a processing circuit) and is communicably coupled to the storage devices 100 using the interface 140 or using another suitable network (e.g., a local or Ethernet connection). The designated entity can maintain an up-to-date list of addresses of buffers 112, given that the storage devices 100 within a group may change from time-to-time due to one or more storage devices become online, are added to a group, are removed from a group, are shut off, and so on.

In yet another example, the addresses of the buffers 112 need not be shared separately beforehand, but rather specified individually in the commands used in the copying operation. In one implementation, the host 101 may issue a copy command to a source device, specifying as a parameter the buffer address 112 of the destination device. The source device can therefore read the data from the memory array 120 of the source device and transfer the data to the buffer 112 in the destination device. The source device can issues a write command to the destination device, specifying the destination device's own buffer 112 as the address of the data to write, to complete the copy operation. In another implementation, the source device receives a copy command from the host 101, specifying the source device's own buffer 112 as the address to place the data being read. The source device 100*a* then specifies its own buffer 112 as the address of data to be written in a write command to the destination device, to complete the copy operation.

In some implementations the host 101 may issue a copy command to the destination device, specifying a storage device as the source device and specifying the address of buffer 112 of the source device as the place where the source data is to be located. The destination device then issues a read command to the source device, specifying the source device's own buffer 112 for the read data. The destination device then performs a data write, using the source device's buffer 112 as the location of the data to be written. In another implementation, the host 101 may issue a copy command to the destination device, specifying a storage device as the source device and the address of buffer 112 of destination device as the place where the source data is to be transferred. The destination device then issues a read command to the source device, specifying the destination device's own buffer 112 for the read data. The destination device 100*b* then performs a data write, using the destination device's buffer 112 as the location of the data to be written.

The sharing of the addresses of the buffers 112 allow the storage devices 100 to directly communicate and transfer data with one another using those shared addresses in a P2P fashion as described herein. In one example, the buffer 112 is a CMB or the like separate from the write buffer 114 and the read buffer 116. In another example, the buffer 112 can be the same as the write buffer 114 or the read buffer 116 having its address shared with the storage devices 100 in the manner described herein. In yet another example, the address of a CMB of one of the storage devices 100 shared with the rest of the storage devices 100 can be mapped to the write buffer 114 or the read buffer 116. In that regard, the buffer 112 is used herein to refer to a storage device's buffer having its address shared among the storage devices 100 for data copy operations. Examples of the address include but are not limited to, a CMB address, an identifier, a pointer, or another suitable indicator that identifies the buffer 112 of a storage device.

As used herein a source device refers to the storage device that contains data to be copied. For example, the source device stores the data to be copied in the memory array 120. Examples of the source device include but are not limited to, a PCIe NVMe device, a NVMeoF device (e.g., an Ethernet SSD), and so on.

As used herein, a destination device refers to the storage device to which the data is transferred (copied). For example, data can be transferred from the source device to the destination device, and in some cases, existing data stored in the memory array 120 of the destination device may be updated to the transferred data. Examples of the destination device include but are not limited to, a PCIe NVMe device, a NVMe over Fabrics (NVMeoF) device (e.g., an Ethernet SSD), and so on.

As used herein, a target device is either a source device or a destination device.

As used herein, a namespace copy is used to refer a copy of an entire range of LBAs in a namespace. With regard to a namespace copy, a source namespace and a destination namespace are specified, along with a start LBA and a length of the LBA range.

As used herein, an LBA copy is used to refer to a copy of specified LBAs defined using a start LBA and a length of the LBA range. With regard to an LBA copy, a source namespace and a destination namespace are specified.

As used herein, an in-network copy refers to a copy of data from a source device to a destination device, where both the source and destination devices are PCIe NVMe devices within a same PCIe network, or NVMeoF devices with the same NVMeoF network.

As used herein, an out-of-network copy refers to a copy of data from a source device to a destination device, where both the source and destination devices are NVMeoF devices (e.g., NVMeoF devices attached over an Ethernet network fabric, or Ethernet SSDs implementing the NVMeoF protocol) on two different networks connected by NVMeoF.

As used herein, an one-to-one copy refers to the use case in which only one source device stores the data to be copied (instead of multiple source devices), and data is copied to only one destination device (instead of multiple destination devices). Examples of the one-to-one copy include but are not limited to, a namespace copy or an LBA copy. An one-to-one copy can be an in-network copy or an out-of-network.

As used herein, a many-to-one copy refers to the user case in which multiple source devices store the data to be copied, and the data is copied to one destination device. In some examples, an order specified in a P2P copy pair descriptor indicates the order by which data from the multiple source devices is to be copied by the destination device. Examples of the many-to-one copy include but are not limited to, a namespace copy or an LBA copy. A many-to-one copy can be an in-network copy or an out-of-network.

FIG. 1B shows a block diagram of examples of a buffer of a source device and a buffer of a destination device, according to some implementations. Referring to FIGS. 1A and 1B, the buffer 112 of a source device (e.g., the storage device 100*a*) and the buffer 112 of a destination device (e.g., the storage device 100*b*) are shown in FIG. 1B.

The buffer 112 of the source device includes a P2P reserved area 150 and a data area 152. The P2P reserved area 150 and the data area 152 are different, predefined areas or partitions in the memory device of the buffer 112 of the source device. The P2P reserved area 150 can be identified by its own range of addresses, defined by a start address and a size, which is exposed on the interface 140. The P2P reserved area 150 is a designated area or partition within the buffer 112 of the source device that is set aside for P2P messages. The source device and the destination device can communicate P2P messages with each other directly over the interface 140 or another suitable communication protocol or network, as the reserved area 150 may be read from or written to by storage devices 100 using the exposed range of addresses on the interface 140. Another device (e.g., a destination device) can send a P2P message to the source device by writing the message to an address within the P2P reserved area 150. In response to the source device detecting that a P2P message has been written to the P2P reserved area 150, the source device can begin processing the P2P message. In some examples, the source device's current operations can be suspended or interrupted to process the P2P message.

As described herein, the P2P message to the source device can trigger the source device to read data stored in the memory array 120 of the source device into dynamically allocated buffers in the data area 152 of the source device or the read buffer 116 of the source device. In that regard, the controller 110 of the source device can dynamically allocate one or more buffers 154, 156, . . . , 158 within the data area 152. Each of the buffers 154, 156, . . . , 158 has its own address. Data can be read from the memory array 120 of the source device into the buffers 154, 156, . . . , 158 using read operations. Each of these buffers may have a buffer size suitable for temporarily storing or staging a chunk of the overall data to be transferred to the destination device. In some examples, the source device can provide the addresses of the buffers 154, 156, . . . , 158 to the destination device by writing those addresses to the P2P reserved area 160 of the destination device, so that the destination device can perform read operations to those addresses to read the data stored in the buffers 154, 156, . . . , 158 of the source device into buffers (e.g., write buffers of the write buffer 114) of the destination device. The buffers 154, 156, . . . , 158 can be allocated in sliding windows, meaning that some of the buffers 154, 156, . . . , 158 are allocated in a first window of time responsive to the P2P message to stage chunks of data for transfer. As transferring of these chunks of data to the destination device is completed, those buffers are deallocated or recycled, and the memory capacity associated therewith is freed to be allocated as additional ones of the buffers 154, 156, . . . , 158. The corresponding write buffers of the write buffer 114 of the destination device can be likewise allocated.

The buffer 112 of the destination device includes a P2P reserved area 160 and a data area 162. The P2P reserved area 160 and the data area 162 are different, predefined areas or partitions in the memory device of the buffer 112 of the destination device. The P2P reserved area 160 can be identified by its own range of addresses, defined by a start address and a size, which is exposed on the interface 140. The P2P reserved area 160 is a designated area or partition within the address space of the buffer 112 of the destination device that is set aside for P2P messages. Another device (e.g., a source device) can send a P2P message to the destination device by writing the message to an address within the range of addresses of the P2P reserved area 160. In response to the destination device detecting that a P2P message has been written to the P2P reserved area 160, the destination device can begin processing the P2P message.

The controller 110 of the destination device can dynamically allocate one or more buffers 164, 166, . . . , 168 within the data area 162. Each of the buffers 164, 166, . . . , 168 has its own address. Data can be written to the memory array 120 of the destination device from the buffers 164, 166, . . . , 168 using write operations. Each of these buffers may have a buffer size suitable for temporarily storing or staging a chunk of the overall data received from the source device. In some examples, the destination device can provide the addresses of the buffers 164, 166, . . . , 168 to the source device by writing those addresses to the P2P reserved area 150 of the source device, so that the source device can perform write operations to those addresses to write the data stored in buffers (e.g., read buffers of the read buffer 116) of the source device to the buffers 164, 166, . . . , 168 of the designation device. The buffers 164, 166, . . . , 168 can be allocated in sliding windows, meaning that some of the buffers 164, 166, . . . , 168 are allocated in a first window of time to receive first chunks of data from the source device. As writing of these chunks of data to the memory array 120 of the destination device is completed, those buffers are deallocated or recycled, and the memory capacity associated therewith is freed to be allocated as additional ones of the buffers 164, 166, . . . , 168. The corresponding read buffers of the read buffer 116 of the source device can be likewise allocated.

Figure 1B:
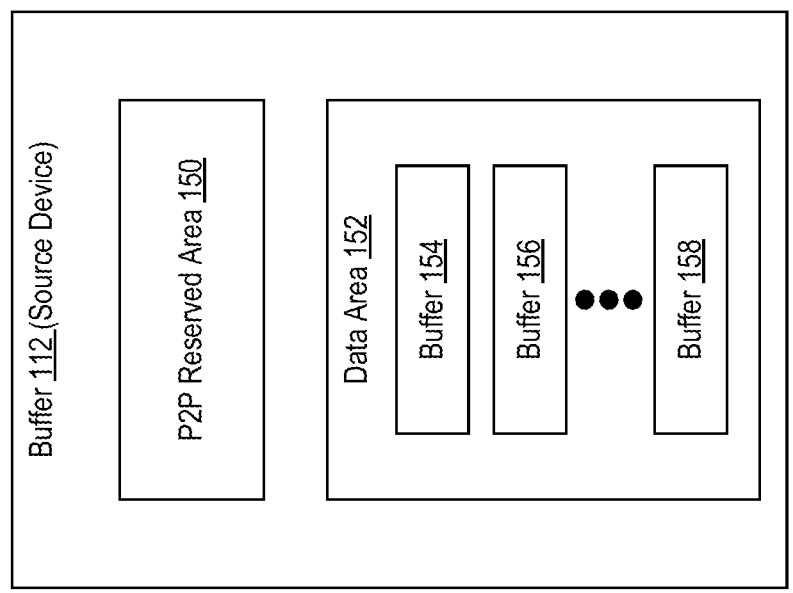
Figure 2:
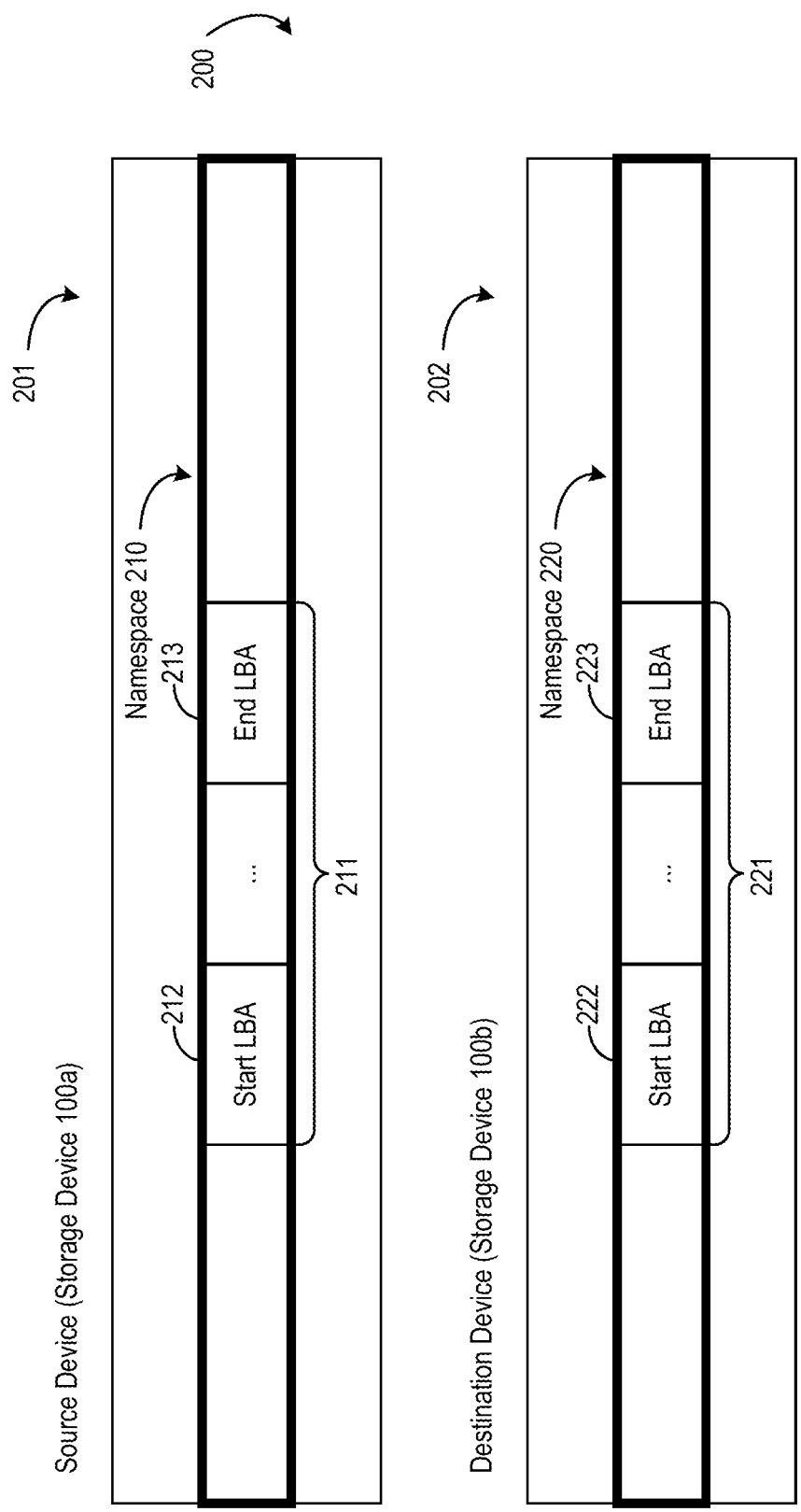
FIG. 2 is a block diagram illustrating an example method for performing data copy, according to some implementations.

FIG. 2 is a block diagram illustrating an example method 200 for performing data copy, according to some implementations. Referring to FIGS. 1A-2, in the method 200, data is copied from a source device (for example, the storage device 100a) to a destination device (for example, the storage device 100b). Within the context of FIG. 2, the storage device 100a and the storage device 100n are mirrored drives, and the storage device 100n has failed. Thus, a spare drive, the storage device 100b, is being brought online to mirror the data stored on the storage device 100a, so that two mirrored devices are online simultaneously. In that regard, the source and destination devices would have identical namespace sizes, and the LBA copy retains the same LBA offset within the namespace. Accordingly, FIG. 2 depicts an one-to-one LBA copy operation at a same offset.

As shown in FIG. 2, the memory array 120 of the storage device 100a has storage capacity 201, which stores data including that corresponding to namespace 210. The memory array 120 of the storage device 100b has storage capacity 202, which stores data including that corresponding to namespace 220. Data corresponding to LBA range 211 of the namespace 210 is copied to the storage capacity 202 of the storage device 100b, as data corresponding to LBA range 221 of the namespace 220. The namespaces 210 and 220 may have a same identifier (e.g., a same number/index such as "namespace 1") and an identical size. The LBA range 211 starts at a start LBA 212 and ends at an end LBA 213, and is typically defined in a command by the start LBA 212 and a length of LBAs of the LBA range 211. The LBA range 221 starts at a start LBA 222 and ends at an end LBA 223, and is typically defined in a command by the start LBA 222 and a length of LBAs of the LBA range 221. Given that the offset being the same, the start LBAs 212 and 222 may have a same identifier (e.g., a same number/index).

In some arrangements, in the one-to-one LBA copy operation as shown in FIG. 2, the host 101 can send to the destination device (e.g., the storage device 100b) a command including descriptors such as one or more of (1) the LBA range 211 to be copied (defined by the start LBA 212 and the length of the LBA range 211); (2) the address of the buffer 112 of the source device (e.g., the storage device 100a); (3) other information such as data copy type (e.g., one-to-one LBA copy operation).

In some arrangements, instead of the host 101 sending the address of the buffer 112 of the source device directly in the command, the address of the buffer 112 can be pre-shared. For example, a table can include a start address of the buffer of each of the storage devices 100 mapped to an ID. Such table can be generated and updated by the host 101 or a central address broker (not shown) as the host 101 or the central address broker accesses each of the storage devices 100. The central address broker is communicably coupled to the host 101 and the storage devices 100 via a suitable network. In some examples, the table can be stored by the central address broker. In the example in which the table is generated by the host 101, the host 101 can send the table (and updated thereof) to the central address broker to be stored. In some examples, the host 101 or the central address broker can send the table (and updated thereof) to each of the storage devices 100 to be stored. The command includes a descriptor of an ID of the buffer 112 of the source device instead of the address of the buffer 112 of the source device. In response to receiving the ID, the destination device looks up the table stored and managed in the central address broker or the destination device itself to determine the start address of the buffer 112 corresponding to the ID.

In some examples, one device (e.g., the destination device) uses the buffer 112 of the source device. In some examples, the source device commits the buffer 112 for another use, the source device interrupts or halts the another use during the span of the copy operation.

In response to receiving the command, the destination device initiates communication with the source device to transfer the data corresponding to the LBA range 211 from the source device to the destination device. For example, the destination device can send a request to the source device via the interface 140, where the request includes the LBA range 211 to be copied (defined by the start LBA 212 and the length of the LBA range 211). The source device, upon receiving the request, reads the data stored in the array 120 into the buffer 112 of the source device, which is exposed to the storage devices 100 including the destination device. Then destination device can transfer, via the interface 140, the data stored in the buffer 112 of the source device into a write buffer of the destination device and then to the array 120 based on the LBA range 221. This can be a write operation into the destination device. For example, a write command specifying the buffer 112 of the source device as the data to be written is sent by the source device to the destination device.

In some examples, the command sent by the destination device to the source device includes an address or ID of the buffer 112 of the destination device. In response to receiving the command, the source device reads the data from array 120 of the source device and transfer the data directly into the buffer 112 of the destination device.

Thus, it depends on the address or ID provided by the destination device when the destination device issues the command to the source device. In the example in which the address or ID of the source device's own buffer 112 is provided in the command, the buffer 112 of the source device is not needed in the copy operation.

In some examples, the source device informs the destination device that the source device has completed reading the chunks of data from the array 112 and that the chunks of data has been placed. In some examples, both chunk and descriptor transfers are always in units of LBAs. Thus, when the source device informs the destination of that transfer of a chunk of data has completed, the source device writes into the buffer 112 of the destination device (e.g., the P2P reserved area 160), a count of LBAs representing the transfer just completed. In some examples, the destination device acknowledges that receipt of the transfer so that source device can reuse the same buffers for placing the next chunks of data from the array 112. The destination device acknowledges by writing into the buffer 112 of the source device (e.g., the P2P reserved area 150), a count of remaining LBAs still to be transferred by the source device to fulfill the descriptor transfer need. In response to the destination device writing a zero for remaining LBAs, the source device determines that the descriptor transfer request has been fully processed. In some arrangements, in the one-to-one LBA copy operation as shown in FIG. 2, the host 101 can send to the source device (e.g., the storage device 100a) a command including descriptors such as one or more of (1) the LBA range 211 to be copied (defined by the start LBA 212 and the length of the LBA range 211); (2) the address or ID of the buffer 112 of the destination device (e.g., the storage device 100b); (3) other information such as data copy type (e.g., one-to-one LBA copy operation). In response to receiving the command, the source device reads the data stored in the array 120 and transfers (e.g. by a DMA or non-DMA write transfer) into the buffer 112 of the destination device, which is exposed to the storage devices 100 including the source device. Then the source device initiates communication with the destination device to write the data in buffer 112 of the destination device, corresponding to the LBA range 211 read from the source device, to the destination device array 120. For example, the source device can send a write request to the destination device via the interface 140, where the request includes the address of destination buffer 112 which already contains data corresponding to the LBA range 211 (defined by the start LBA 212 and the length of the LBA range 211) and the destination start LBA and the length of data to be written (which may be identical to the source start LBA and length). The destination device writes the data stored in the destination buffer 112 and to the array 120 of the destination device.

In some examples, the source device reads the data from array 120 into the buffer 112 of the source device, and sends to the destination device a write request specifying address or ID of the buffer 112 of the source device. The destination device then performs the transfer, transferring the data from the buffer 112 of the source device into the destination device.

Figure 3:
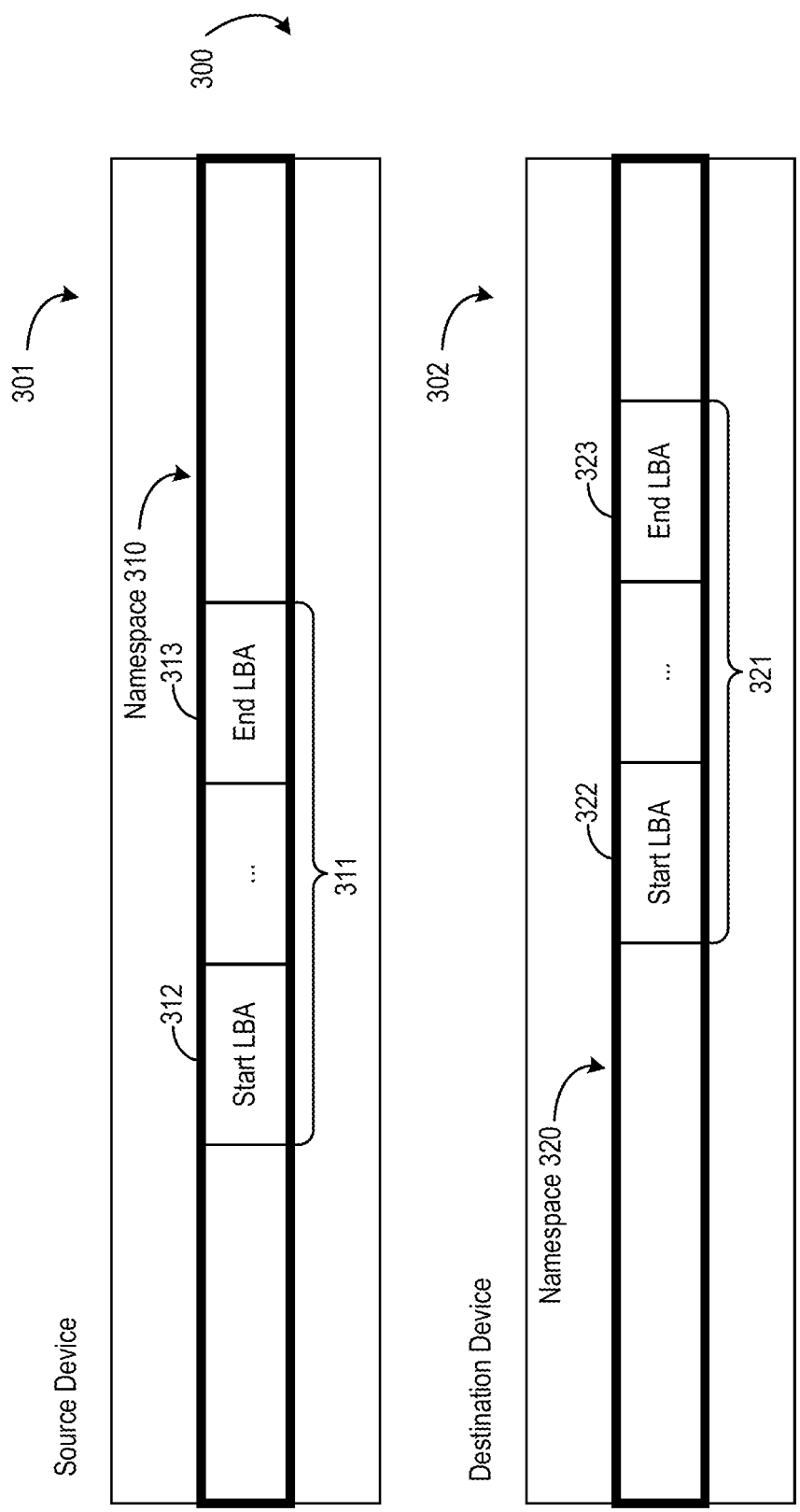
FIG. 3 is a block diagram illustrating an example method for performing data copy, according to some implementations.

FIG. 3 is a block diagram illustrating an example method 300 for performing data copy, according to some implementations. Referring to FIGS. 1A, 1B, and 3, in the method 300, data is copied from a source device (for example, the storage device 100a) to a destination device (for example, the storage device 100b). Within the context of FIG. 3, the storage device 100a and the storage device 100n are virtualized mirrored drives, and the storage device 100n has failed. Thus, a spare virtualized drive, the storage device 100b, is being brought online to mirror the data stored on the storage device 100a, so that two mirrored virtualized devices are online simultaneously. In that regard, although the source and destination devices would have identical namespace sizes, and the LBA copy corresponds to a different offset in the destination namespace due to virtualization. Accordingly, FIG. 3 depicts an one-to-one LBA copy operation at different offsets.

As shown in FIG. 3, the memory array 120 of the storage device 100a has storage capacity 301, which stores data including that corresponding to namespace 310. The memory array 120 of the storage device 100b has storage capacity 302, which stores data including that corresponding to namespace 320. Data corresponding to LBA range 311 of the namespace 310 is copied to the storage capacity 302 of the storage device 100b, as data corresponding to LBA range 321 of the namespace 320. The namespaces 310 and 320 may have a same identifier (e.g., a same number/index such as "namespace 1") and an identical size. The LBA range 311 starts at a start LBA 312 and ends at an end LBA 313, and is typically defined in a command by the start LBA 312 and a length of LBAs of the LBA range 311. The LBA range 321 starts at a start LBA 322 and ends at an end LBA 323, and is typically defined in a command by the start LBA 322 and a length of LBAs of the LBA range 321. Given that the offset being different, the start LBAs 312 and 322 may have different identifiers (e.g., different numbers/indexes).

Figure 4:
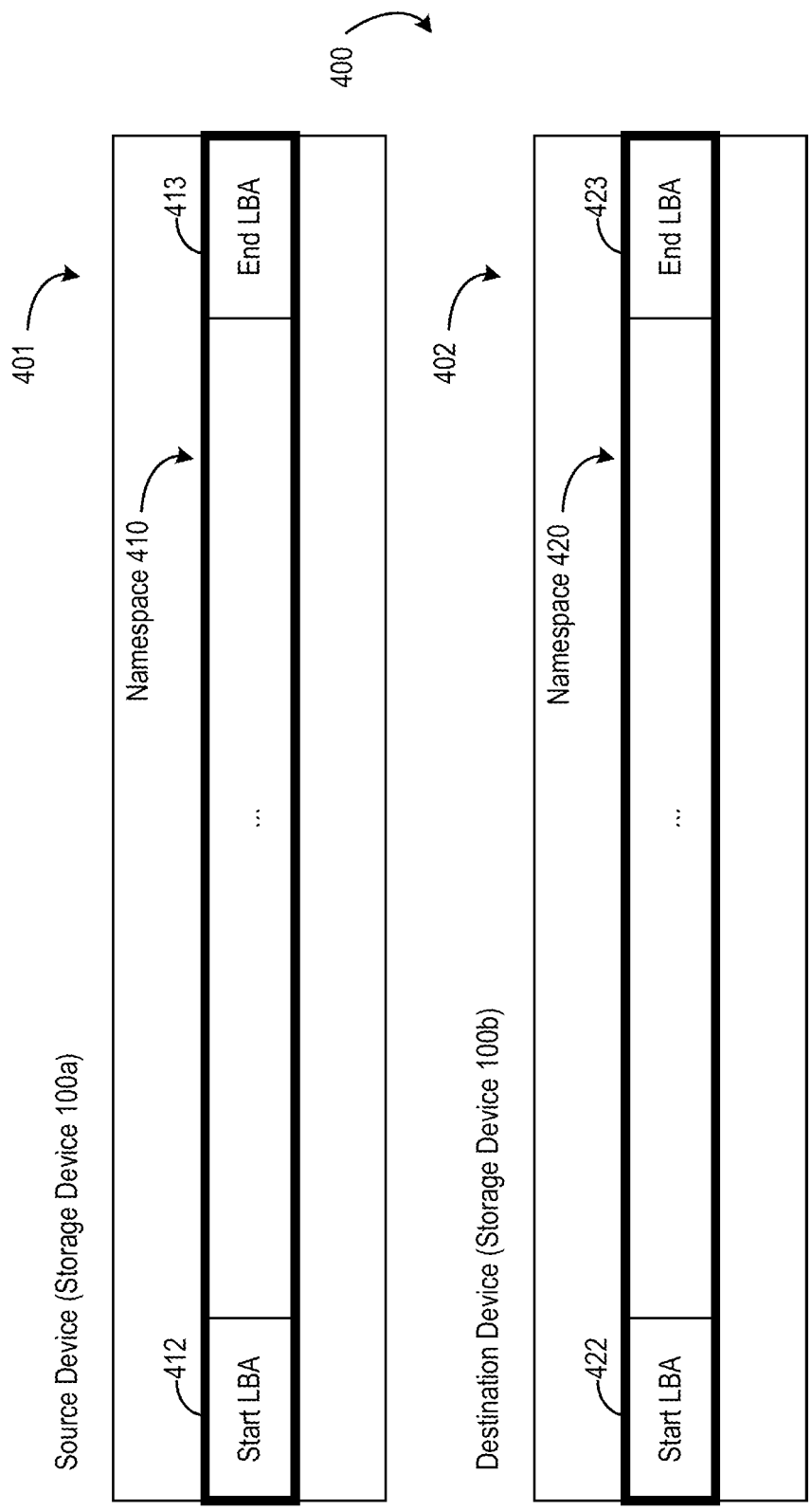
FIG. 4 is a block diagram illustrating an example method for performing data copy, according to some implementations.

FIG. 4 is a block diagram illustrating an example method 400 for performing data copy, according to some implementations. Referring to FIGS. 1A, 1B, and 4, in the method 400, data is copied from a source device (for example, the storage device 100a) to a destination device (for example, the storage device 100b). Within the context of FIG. 4, a physical drive copy is performed, such that all information corresponding to a namespace (including partition information, file systems, and so on) is copied from the source device to the destination device. In that regard, the source and destination devices have identical namespace sizes, and the entire namespace is copied. Accordingly, FIG. 4 depicts an one-to-one LBA copy for identical namespaces on the storage devices 100a and 100b.

As shown in FIG. 4, the memory array 120 of the storage device 100a has storage capacity 401, which stores data including that corresponding to namespace 410. The memory array 120 of the storage device 100b has storage capacity 402, which stores data including that corresponding to namespace 420. Data corresponding to the entire namespace 410 is copied to the storage capacity 402 of the storage device 100b, as data corresponding to the namespace 420. The namespaces 210 and 220 may have a same identifier (e.g., a same number/index such as "namespace 1") and an identical size. The namespace 410 starts at a start LBA 412 and ends at an end LBA 413, and is typically defined in a command by the start LBA 412 and a length of LBAs of the namespace 410. The namespace 420 starts at a start LBA 422 and ends at an end LBA 423, and is typically defined in a command by the start LBA 422 and a length of LBAs of the namespace 420. The start LBAs 412 and 422 may have a same identifier (e.g., a same number/index).

Figure 5:
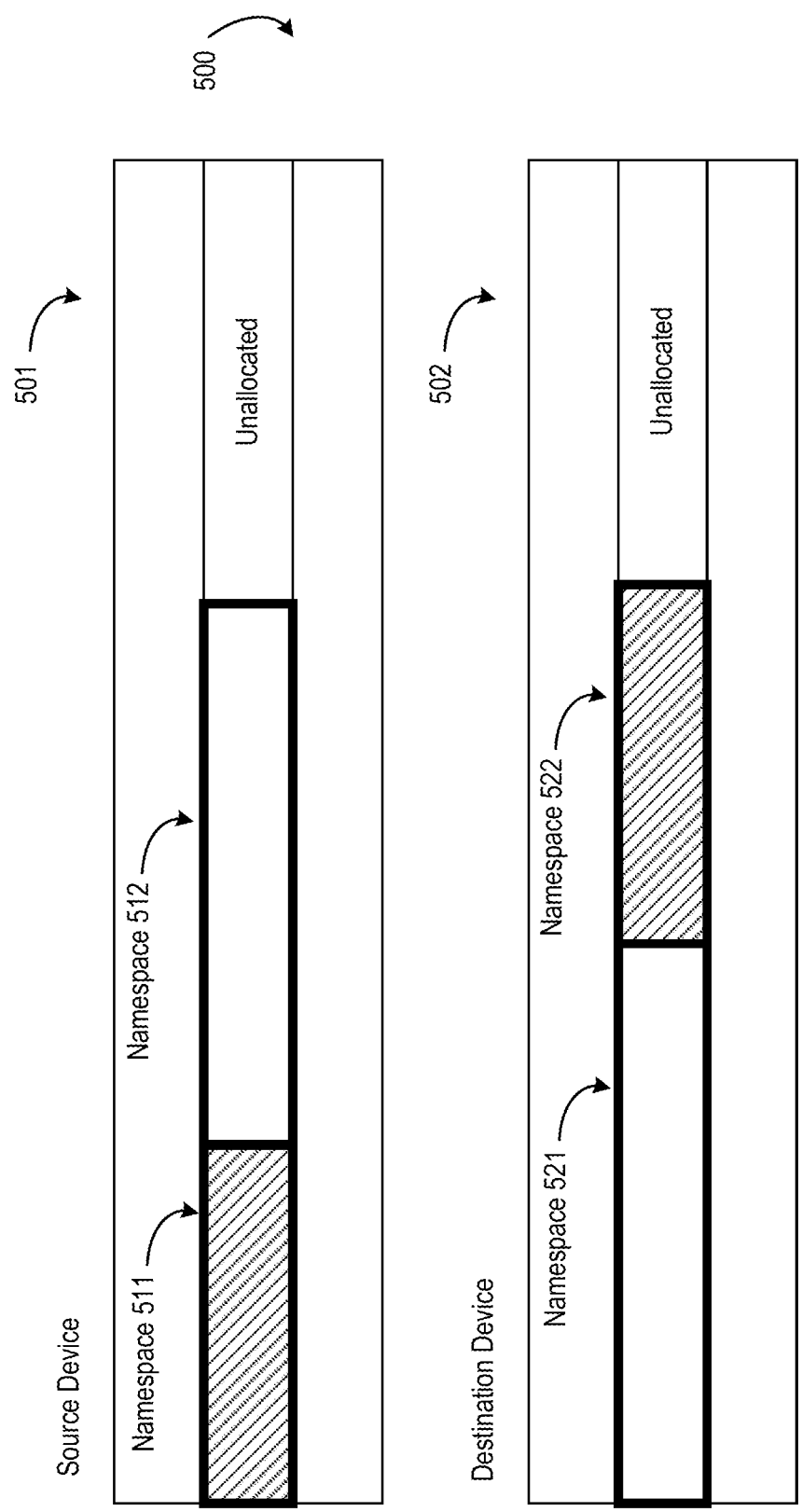
FIG. 5 is a block diagram illustrating an example method for performing data copy, according to some implementations.

FIG. 5 is a block diagram illustrating an example method 500 for performing data copy, according to some implementations. Referring to FIGS. 1A, 1B, and 5, in the method 500, data is copied from a source device (for example, the storage device 100*a*) to a destination device (for example, the storage device 100*b*). Within the context of FIG. 5, the storage device 100*a* and the storage device 100*n* are virtualized drives. A physical drive copy is performed, such that all information corresponding to a namespace (including partition information, file systems, and so on) is copied from the source device to the destination device. In that regard, the source and destination devices have different namespaces due to virtualization, and the entire namespace 511 is copied to a different namespace 522. Accordingly, FIG. 5 depicts an one-to-one namespace copy from one namespace to another on the storage devices 100*a* and 100*b*.

As shown in FIG. 5, the memory array 120 of the storage device 100*a* has storage capacity 501, which stores data including that corresponding to namespace 511 and namespace 512. The memory array 120 of the storage device 100*b* has storage capacity 502, which stores data including that corresponding to namespace 521 and namespace 522. Data corresponding to the entire namespace 511 is copied to the storage capacity 502 of the storage device 100*b*, as data corresponding to the namespace 522. The namespaces 511 and 522 may have different identifiers (e.g., different numbers/indexes such as "namespace 1" and "namespace 2" respectively) and a same size. The namespace 511 starts at a start LBA and ends at an end LBA, and is typically defined in a command by the start LBA and a length of LBAs of the namespace 511. The namespace 522 starts at a start LBA and ends at an end LBA, and is typically defined in a command by the start LBA and a length of LBAs of the namespace 522.

Figure 6:
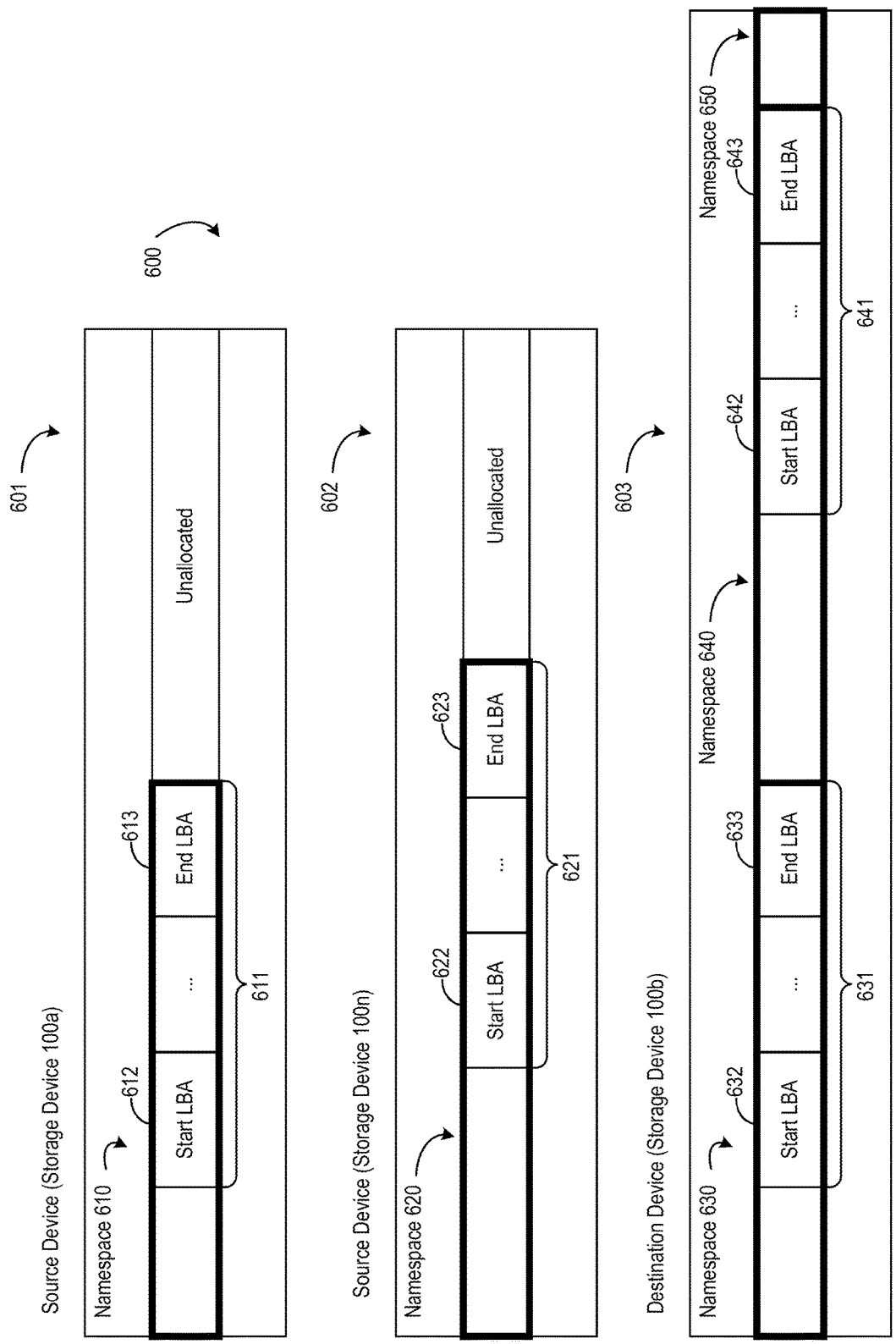
FIG. 6 is a block diagram illustrating an example method for performing data copy, according to some implementations.

FIG. 6 is a block diagram illustrating an example method 600 for performing data copy, according to some implementations. Referring to FIGS. 1A, 1B, and 6, in the method 600, data is copied from multiple source devices (for example, the storage devices 100*a* and 100*n*) to a destination device (for example, the storage device 100*b*). Within the context of FIG. 6, the destination device may be a high-capacity drive. As shown, the LBA range 611 from namespace 610 of the storage device 100*a* and LBA range 621 from namespace 620 are being respectively copied to LBA range 631 of namespace 630 and LBA range 641 of namespace 640 of the storage device 100*b*. Accordingly, FIG. 6 depicts a many-to-one LBA copy into different destination namespaces and the same offset as the source namespaces.

As shown in FIG. 6, the memory array 120 of the storage device 100*a* has storage capacity 601, which stores data including that corresponding to namespace 610. The memory array 120 of the storage device 100*n* has storage capacity 602, which stores data including that corresponding to namespace 620. The memory array 120 of the storage device 100*b* has storage capacity 603, which stores data including that corresponding to namespace 630, namespace 640, and namespace 650. Data corresponding to LBA range 611 of the namespace 610 is copied to the storage capacity 603 of the storage device 100*b*, as data corresponding to LBA range 631 of the namespace 630. In addition, data corresponding to LBA range 621 of the namespace 620 is copied to the storage capacity 603 of the storage device 100*b*, as data corresponding to LBA range 641 of the namespace 640.

The namespaces 610 and 630 may have a same identifier (e.g., a same number/index such as "namespace 1") and an identical size, in some examples. In other examples, the namespaces 610 and 630 may have different identifiers (e.g., different numbers/indexes such as "namespace 1" and "namespace 3" respectively) and an identical size. The LBA range 611 starts at a start LBA 612 and ends at an end LBA 613, and is typically defined in a command by the start LBA 612 and a length of LBAs of the LBA range 611. The LBA range 631 starts at a start LBA 632 and ends at an end LBA 633, and is typically defined in a command by the start LBA 632 and a length of LBAs of the LBA range 631. Given that the offset being the same, the start LBAs 612 and 632 may have a same identifier (e.g., a same number/index).

The namespaces 620 and 640 may have different identifiers (e.g., different numbers/indexes such as "namespace 1" and "namespace 2" respectively) and an identical size. The LBA range 621 starts at a start LBA 622 and ends at an end LBA 623, and is typically defined in a command by the start LBA 622 and a length of LBAs of the LBA range 621. The LBA range 641 starts at a start LBA 642 and ends at an end LBA 643, and is typically defined in a command by the start LBA 642 and a length of LBAs of the LBA range 641. Given that the offset being the same, the start LBAs 622 and 642 may have a same identifier (e.g., a same number/index).

In some arrangements, the host 101 sends a command to the destination device (e.g., the storage device 100*b*) that includes a descriptor indicating an order by which the LBA range 611 and the LBA range 621 are to be copied to the storage capacity 603. In particular, the descriptor indicates that the LBA range 611 is to be copied to a namespace (e.g., the namespace 630) having a lower number/index than that of a namespace (e.g., the namespace 640) to which the LBA range 621 is to be copied. In some examples, the command includes other descriptors such as a descriptor that indicates the address of the buffer 112 of the storage devices 100*a* from which the storage device 100*b* can transfer data corresponding to the LBA range 611, a descriptor that indicates the address of the buffer 112 of the storage devices 100*n* from which the storage device 100*b* can transfer data corresponding to the LBA range 621, a descriptor that indicates a transfer type (e.g., many-to-one LBA copy into different destination namespaces with the same offsets as the source namespace), among other descriptors.

Figure 7:
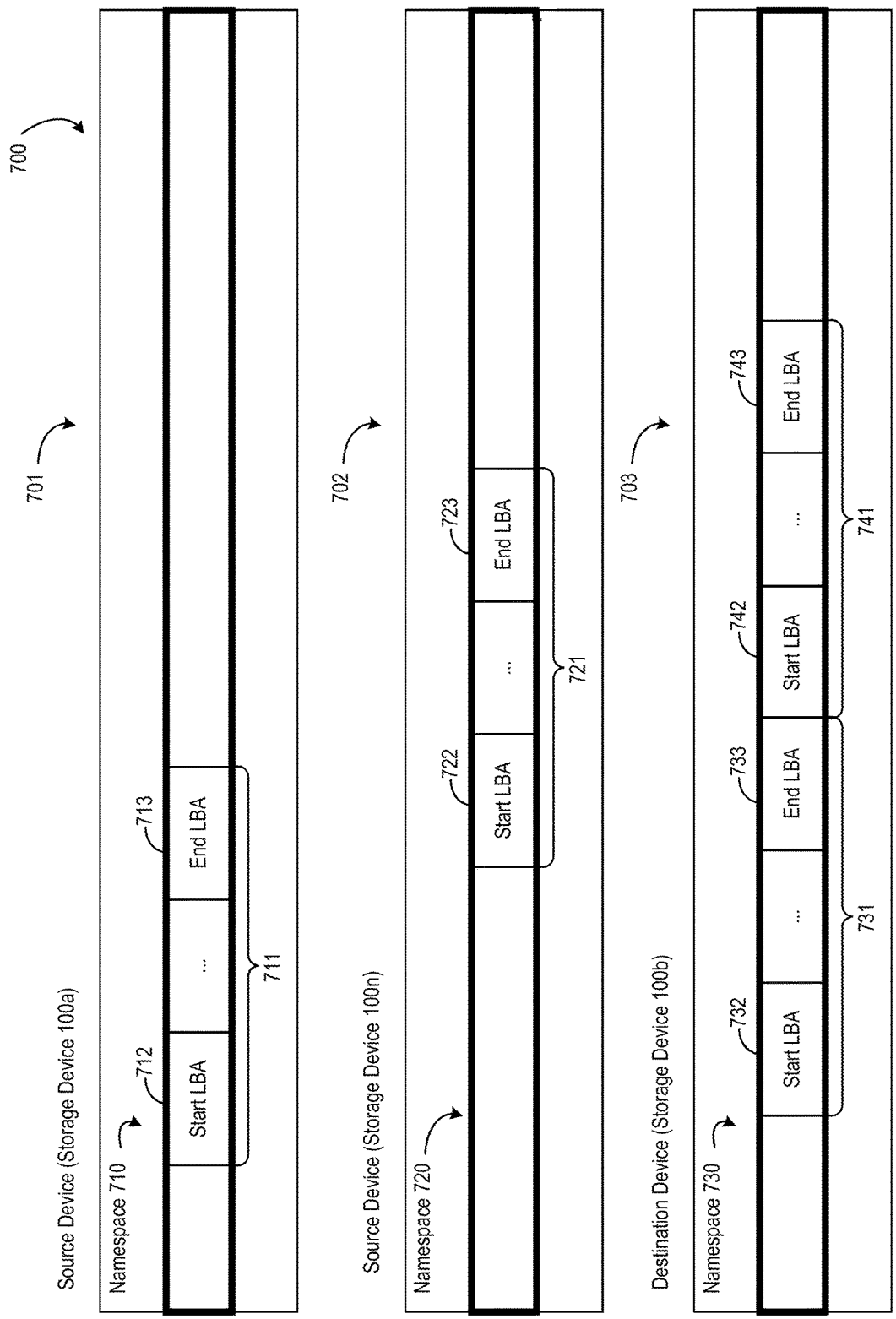
FIG. 7 is a block diagram illustrating an example method for performing data copy, according to some implementations.

FIG. 7 is a block diagram illustrating an example method 700 for performing data copy, according to some implementations. Referring to FIGS. 1A, 1B, and 7, in the method 700, data is copied from multiple source devices (for example, the storage devices 100*a* and 100*n*) to a destination device (for example, the storage device 100*b*). As shown, the LBA range 711 from namespace 710 of the storage device 100*a* and LBA range 721 from namespace 720 are being respectively copied to LBA range 731 and LBA range 741 of namespace 730 of the storage device 100*b*. Accordingly, FIG. 7 depicts a many-to-one LBA copy into the same destination namespace with different offsets, where different LBA ranges are taken from different source namespaces and written into a single destination namespace.

As shown in FIG. 7, the memory array 120 of the storage device 100*a* has storage capacity 701, which stores data including that corresponding to namespace 710. The memory array 120 of the storage device 100*n* has storage capacity 702, which stores data including that corresponding to namespace 720. The memory array 120 of the storage device 100b has storage capacity 703, which stores data including that corresponding to namespace 730. Data corresponding to LBA range 711 of the namespace 710 is copied to the storage capacity 703 of the storage device 100b, as data corresponding to LBA range 741 of the namespace 730. In addition, data corresponding to LBA range 721 of the namespace 720 is copied to the storage capacity 703 of the storage device 100b, as data corresponding to LBA range 731 of the namespace 730. In other words, data corresponding to the LBA ranges 711 and 721 is copied to the same name space 730.

The namespaces 710, 720, and 730 may have a same identifier (e.g., a same number/index such as "namespace 1") and an identical size, in some examples. The LBA range 711 starts at a start LBA 712 and ends at an end LBA 713, and is typically defined in a command by the start LBA 712 and a length of LBAs of the LBA range 711. The LBA range 721 starts at a start LBA 722 and ends at an end LBA 723, and is typically defined in a command by the start LBA 722 and a length of LBAs of the LBA range 721. The LBA range 731 starts at a start LBA 732 and ends at an end LBA 733, and is typically defined in a command by the start LBA 732 and a length of LBAs of the LBA range 731. The LBA range 741 starts at a start LBA 742 and ends at an end LBA 743, and is typically defined in a command by the start LBA 742 and a length of LBAs of the LBA range 741.

As shown, after the copy operation, the start LBA 742 of the LBA range 741 immediately follows the end LBA 733 of the LBA range 731. Thus, data from the LBA range 711 is concatenated to data from the LBA range 721, in the same namespace 730. The offsets for the start LBA 722 and the offset for the start LBA 742 are therefore different.

In some arrangements, the host 101 sends a command to the destination device (e.g., the storage device 100b) that includes a descriptor indicating an order by which the LBA range 671 and the LBA range 721 are to be copied to the storage capacity 703. In particular, the descriptor indicates that the LBA range 711 is to be copied to a LBA range (e.g., the LBA range 741) having the start LBA 742 immediately after the end LBA 733 of a LBA range (e.g., the LBA range 731) to which the LBA range 721 is to be copied. In some examples, the command includes other descriptors such as a descriptor that indicates the address of the buffer 112 of the storage devices 100a from which the storage device 100b can transfer data corresponding to the LBA range 711, a descriptor that indicates the address of the buffer 112 of the storage devices 100n from which the storage device 100b can transfer data corresponding to the LBA range 721, a descriptor that indicates a transfer type (e.g., many-to-one LBA copy with same namespace and different offsets, concatenation), among other descriptors.

Figure 8:
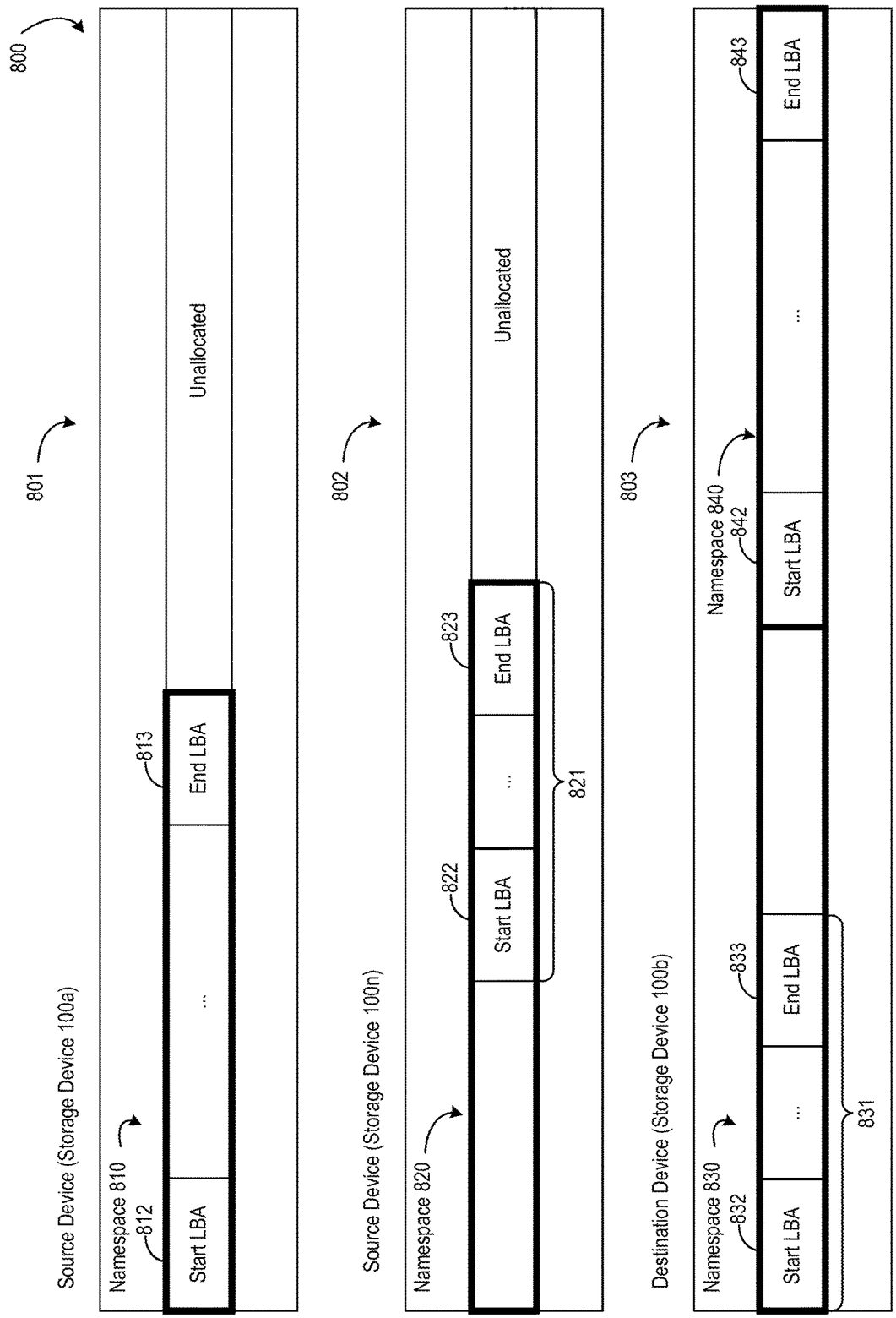
FIG. 8 is a block diagram illustrating an example method for performing data copy, according to some implementations.

FIG. 8 is a block diagram illustrating an example method 800 for performing data copy, according to some implementations. Referring to FIGS. 1A, 1B, and 8, in the method 800, data is copied from multiple source devices (for example, the storage devices 100a and 100n) to a destination device (for example, the storage device 100b). As shown, the entire namespace 810 of the storage device 100a and LBA range 821 from namespace 820 of the storage device 100n are being respectively copied to namespace 840 and LBA range 831 of namespace 830 of the storage device 100b. Accordingly, FIG. 8 depicts a many-to-one LBA copy and namespace copy with different offsets.

As shown in FIG. 8, the memory array 120 of the storage device 100a has storage capacity 801, which stores data including that corresponding to namespace 810. The memory array 120 of the storage device 100n has storage capacity 802, which stores data including that corresponding to namespace 820. The memory array 120 of the storage device 100b has storage capacity 803, which stores data including that corresponding to namespace 830 and namespace 840. Data corresponding to the entire namespace 810 is copied to the storage capacity 803 of the storage device 100b, as data corresponding to the namespace 840. In addition, data corresponding to LBA range 821 of the namespace 820 is copied to the storage capacity 803 of the storage device 100b, as data corresponding to LBA range 831 of the namespace 830.

In some examples, the namespaces 810, 820, and 830 may have a same identifier (e.g., a same number/index such as "namespace 1"). In some examples, the namespaces 810 and 840 may have different identifiers (e.g., different numbers/indexes such as "namespace 1" and "namespace 2", respectively) and a same size. The namespace 810 starts at a start LBA 812 and ends at an end LBA 813, and is typically defined in a command by the start LBA 812 and a length of LBAs of the namespace 810. The LBA range 821 starts at a start LBA 822 and ends at an end LBA 823, and is typically defined in a command by the start LBA 822 and a length of LBAs of the LBA range 821. The LBA range 831 starts at a start LBA 832 and ends at an end LBA 833, and is typically defined in a command by the start LBA 832 and a length of LBAs of the LBA range 831. The namespace 840 starts at a start LBA 842 and ends at an end LBA 843, and is typically defined in a command by the start LBA 842 and a length of LBAs of the namespace 840. Given that the offset being different, the start LBAs 822 and 832 may have different identifiers (e.g., different numbers/indexes).

In some arrangements, the host 101 sends a command to the destination device (e.g., the storage device 100b) that includes a descriptor indicating an order by which the namespace 810 and the LBA range 821 are to be copied to the storage capacity 803. In particular, the descriptor indicates that the LBA range 821 is to be copied to a namespace (e.g., the namespace 830) having a lower number/index than that of a namespace (e.g., the namespace 840) to which the namespace 810 is to be copied. In some examples, the command includes other descriptors such as a descriptor that indicates the address of the buffer 112 of the storage devices 100a from which the storage device 100b can transfer data corresponding to the namespace 810, a descriptor that indicates the address of the buffer 112 of the storage devices 100n from which the storage device 100b can transfer data corresponding to the LBA range 621, a descriptor that indicates a transfer type (e.g., many-to-one LBA copy with different namespaces and same offsets), among other descriptors.

In the arrangements disclosed herein, the copy offload mechanism use the buffers 112, which can be Persistent (i.e. non-volatile) CMB buffers to communicate data. In some implementations the Persistent CMB buffers may be allocated in a Persistent Memory Region (PMR), which may be implemented with non-volatile byte addressable memory such as, but not limited to, Phase Change Memory (PCM), Magnetic Random Access memory (MRAM) or Resistive Random Access Memory (ReRAM). The buffers 112 can be shared by the host 101 and accessible to a peer device (e.g., other storage devices 100) for the copy operations disclosed herein. In addition to the accessibility, the copy offload mechanisms disclosed herein also use the buffers 112 to copy data like a sliding window.

Figure 9A:
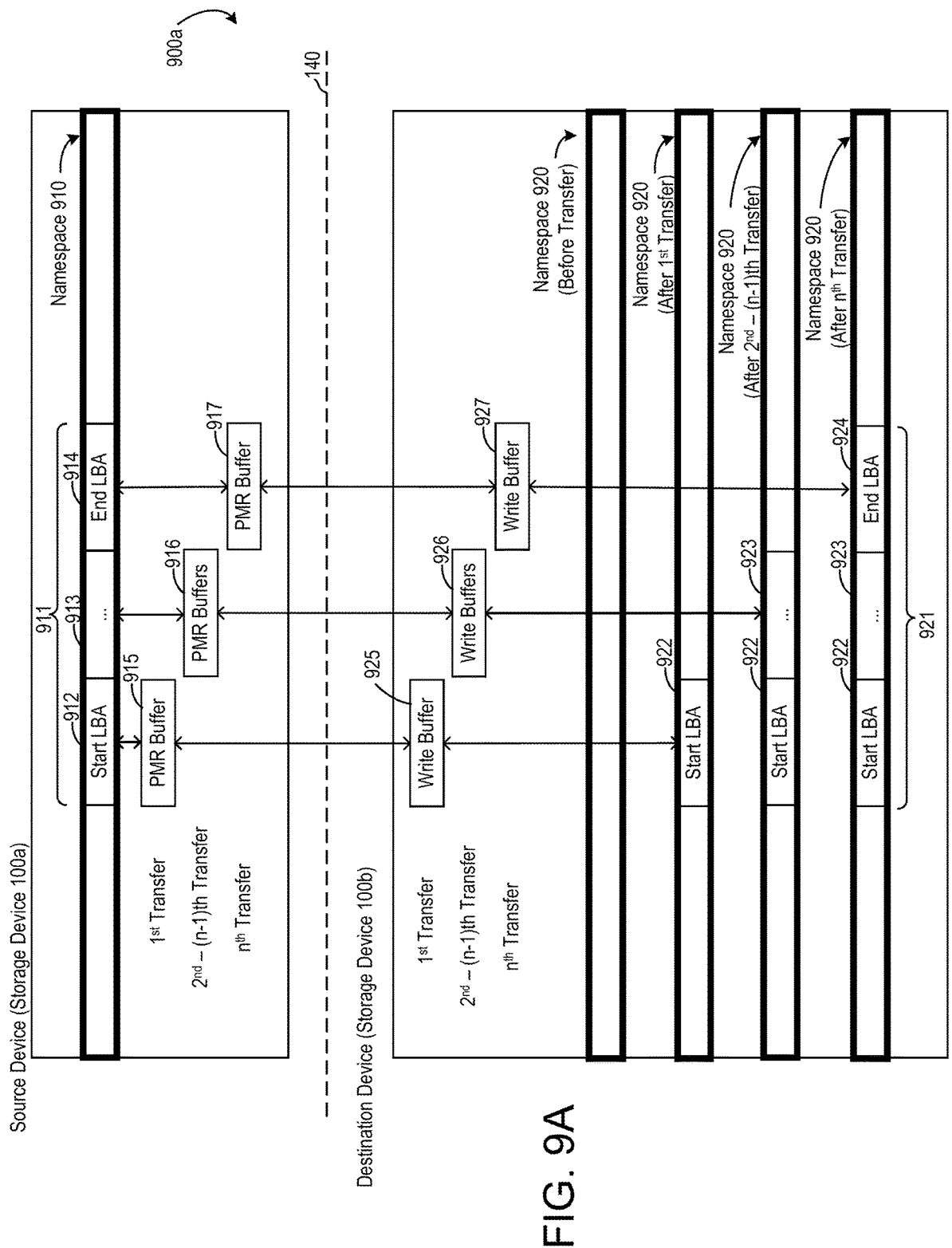
FIG. 9A is a block diagram illustrating an example method for performing data copy, according to some implementations.

In that regard, FIG. 9A is a block diagram illustrating an example method 900a for performing data copy using the sliding window mechanism, according to some implementations. In the method 900a, the buffer 112 of the source device and the write buffer 114 of the destination device are used.

As shown in FIG. 9A, data corresponding to an LBA range 911 in namespace 910 as stored on the source device (the storage device 100a in this context) is being copied in the method 900a to the destination device (the storage device 100b in this context), as an LBA range 921 in namespace 920. Due to bandwidth and processing power limitations on the source device, the destination device, and the interface 140, data corresponding to the LBA range 911 is to be transferred in multiple (n) different transfers, from the first transfer to the nth transfer. The first transfer being performed before the second transfer, etc., with the nth transfer being the last transfer. In each transfer, a chunk of data corresponding to the buffer size of each of the buffers 915, 916, 917, 925, 926, and 927 is transferred from the source device to the destination device.

For example, in the first transfer, the source device reads data corresponding to the start LBA 912 from a physical location on the memory array 120 into a Persistent Memory Region (PMR) buffer 915. The PMR buffer 915 is an example of the buffer 154 dynamically allocated in the data area 152 of the source device. A data transfer (e.g., a Direct Memory Access (DMA) transfer, a non-DMA transfer, or so on) is performed by the destination device to transfer the data from the PMR buffer 915 to a write buffer 925 of the destination device over the interface 140, in a P2P read operation. The write buffer 925 is an example of a buffer dynamically allocated in the write buffer 114 of the destination device. The destination device then writes the data from the write buffer 925 to a physical location on the memory array 120 of the destination device that corresponds to the start LBA 922.

In each of the second to the (n−1)th transfer, the source device reads data corresponding to a respective one of intermedia LBA(s) 913 from a physical location on the memory array 120 into a respective one of the PMR buffers 916. Each of the PMR buffers 916 is an example of the buffer 156 dynamically allocated in the data area 152 of the source device. A data transfer (e.g., a DMA transfer, a non-DMA transfer, or so on) is performed by the destination device to transfer the data from each of the PMR buffers 916 to a corresponding one of the write buffers 926 of the destination device over the interface 140, in a P2P read operation. Each of the write buffers 926 is an example of a buffer dynamically allocated in the write buffer 114 of the destination device. The destination device then writes the data from each of the write buffers 926 to a physical location on the memory array 120 of the destination device that corresponds to a respective one of the intermediate LBA(s) 923.

In the last transfer, the source device reads data corresponding to the end LBA 914 from a physical location on the memory array 120 into the PMR buffer 917. The PMR buffer 917 is an example of the buffer 158 dynamically allocated in the data area 152 of the source device. A data transfer (e.g., a DMA transfer, a non-DMA transfer, or so on) is performed by the destination device to transfer the data from the PMR buffer 917 to the write buffer 927 of the destination device over the interface 140, in a P2P read operation. The write buffer 927 is an example of a buffer dynamically allocated in the write buffer 114 of the destination device. The destination device then writes the data from the write buffer 927 to a physical location on the memory array 120 of the destination device that corresponds to the end LBA 924.

Figure 9B:
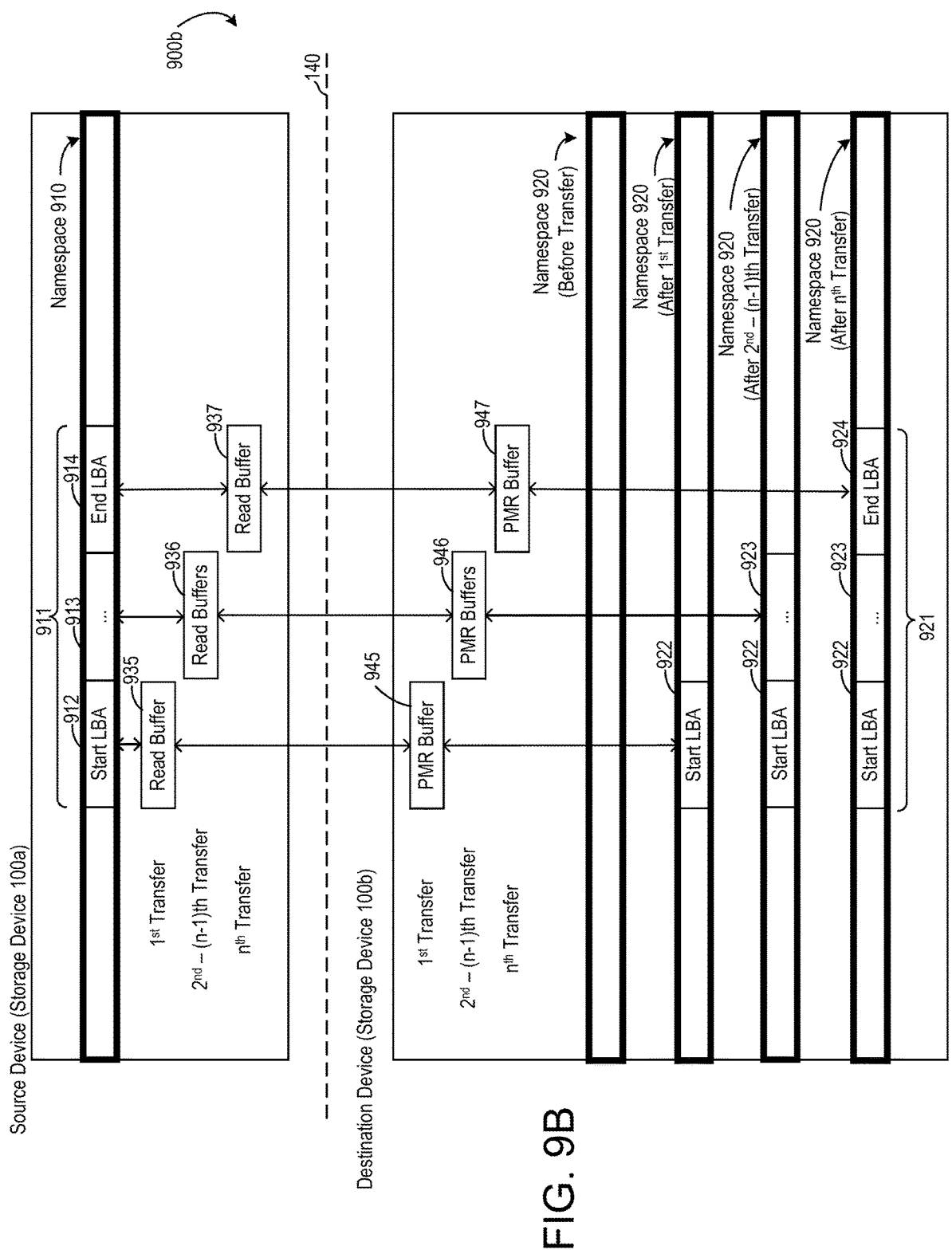
FIG. 9B is a block diagram illustrating an example method for performing data copy, according to some implementations.

FIG. 9B is a block diagram illustrating an example method 900b for performing data copy using the sliding window mechanism, according to some implementations. In the method 900b, the buffer 112 of the destination device and the read buffer 116 of the source device are used.

As shown in FIG. 9B, data corresponding to an LBA range 911 in namespace 910 as stored on the source device (the storage device 100a in this context) is being copied in the method 900b to the destination device (the storage device 100b in this context), as an LBA range 921 in namespace 920. Due to bandwidth and processing power limitations on the source device, the destination device, and the interface 140, data corresponding to the LBA range 911 is to be transferred in multiple (n) different transfers, from the first transfer to the nth transfer. The first transfer being performed before the second transfer, etc., with the nth transfer being the last transfer. In each transfer, a chunk of data corresponding to the buffer size of each of the buffers 935, 936, 937, 945, 956, and 957 is transferred from the source device to the destination device.

For example, in the first transfer, the source device reads data corresponding to the start LBA 912 from a physical location on the memory array 120 into a read buffer 935. The read buffer 935 is an example of a buffer dynamically allocated in the read buffer 116 of the source device. A data transfer (e.g., a DMA transfer, a non-DMA transfer, or so on) is performed by the source device 100a to transfer the data from the read buffer 935 to a PMR buffer 945 of the destination device over the interface 140, for example, in a P2P write operation. The PMR buffer 945 is an example of the buffer 164 dynamically allocated in the data area 162 of the destination device. The destination device then writes the data from the PMR buffer 945 to a physical location on the memory array 120 of the destination device that corresponds to the start LBA 922.

In each of the second to the (n−1)th transfer, the source device reads data corresponding to a respective one of intermedia LBA(s) 913 from a physical location on the memory array 120 into a respective one of the read buffers 936. Each of the read buffers 936 is an example of a buffer dynamically allocated in the read buffer 116 of the source device. A data transfer (e.g., a DMA transfer, a non-DMA transfer, or so on) is performed by the source device 100a to transfer the data from each of the read buffers 936 to a respective one of the PMR buffers 946 of the destination device over the interface 140, for example, in a P2P write operation. Each of the PMR buffers 946 is an example of the buffer 166 dynamically allocated in the data area 162 of the destination device. The destination device then writes the data from each of the PMR buffers 946 to a physical location on the memory array 120 of the destination device that corresponds to a respective one of the intermediate LBA(s) 923.

In the last transfer, the source device reads data corresponding to the end LBA 914 from a physical location on the memory array 120 into the read buffer 937. The read buffer 937 is an example of a buffer dynamically allocated in the read buffer 116 of the source device. A data transfer (e.g., a DMA transfer, a non-DMA transfer, or so on) is performed by the source device to transfer the data from the read buffer 937 to a PMR buffer 947 of the destination device over the interface 140, for example, in a P2P write operation. The PMR buffer 947 is an example of the buffer 168 dynamically allocated in the data area 162 of the destination device. The destination device then writes the data from the PMR buffer 947 to a physical location on the memory array 120 of the destination device that corresponds to the end LBA 924. The buffers 915-917 can be allocated in sliding windows, meaning that some of the buffers 915-917 are allocated in a first window of time responsive to the P2P message to stage chunks of data for transfer. As transferring of these chunks of data to the destination device is completed, those buffers are deallocated or recycled, and the memory capacity associated therewith is freed to be allocated as additional ones of the buffers 915-917. The buffers 935-937 can be likewise allocated.

Similarly, the buffers 925-927 can be allocated in sliding windows, meaning that some of the buffers 925-927 are allocated in a first window of time to receive first chunks of data from the source device. As writing of these chunks of data to the memory array 120 of the destination device is completed, those buffers are deallocated or recycled, and the memory capacity associated therewith is freed to be allocated as additional ones of the buffers 925-927. The buffers 945-947 can be likewise allocated.

In an example copy operation, data (e.g., 1 GB) is to be copied from a source device (e.g., the storage device 100a) to a destination device (e.g., the storage device 100b). In this example, the source device and the destination device each uses a buffer mechanism (e.g., the buffer 112) having a particular buffer size (e.g., 128 KB) for each dynamically allocated buffer (e.g., each of buffers 154, 156, 158, 164, 166, and 168, and each of PMR buffers 915, 916, 917, 925, 926, and 927). Thus, the total data to be copied is divided into 8192 chunks, to be transferred from the source device to the destination device using 8192 transfers (e.g., n is 8192 in FIG. 9), each chunk or transfer corresponds to 128 KB of data.

Conventionally, to perform such copy operation, the host 101 submits a read request (e.g., an NVMe Read Request) to the source device (e.g., for a "Sq Rd" operation) for a chunk (128 KB) of data. In response to the read request, the source device performs a read operation to read the requested data from the memory array 120 into the read buffer 116 (e.g., in a "NVM Rd" operation). The data is then transferred from the read buffer 116 across the interface 140 (e.g., the NVMe Interface) (e.g., in a "PCIe Rd" operation). Next, the data is transported across the bus 106. For example, the data is transported across a Root Complex (e.g., in a "RC Rd" operation) and across the memory bus (e.g., in a "Mem Rd" operation), to be stored in a memory buffer of the memory 102. Next, the host 101 submits a write request (e.g., a NVMe Write Request) to the destination device (e.g., in a "Sq Wt" operation). In response to the write request, the destination device causes data to be read from the memory buffer of the memory 102 and transported across the bus 106. For example, the data is transported across the memory bus (e.g., in a "Mem Wt" operation) and across the Root Complex (e.g., in a "RC Wt" operation). The data is then transferred across the interface 140 (e.g., the NVMe Interface) into the write buffer 114 of the destination device (e.g., in a "PCIe Wt" operation). Next, the destination device performs a write operation to write the data from the write buffer 114 into the memory array 120, (e.g., in a "NVM Wt" operation). The above process (including 12 operations) are repeated for each chunk, until all 8192 chunks have been transferred to the memory array of 120 the destination device. Accordingly, to transfer 1 GB of data, a total of 98,304 operations are required conventionally. In other words, to process each chunk, 3 separate transactions for a read operation (including a command phase/transaction in which a read command is sent from the host 101 to the source device, a read phase/transaction in which data is read from the memory array 120 of the source device, and a data transfer phase/transaction in which data is transferred from the source device to the memory 102 of the host 101) and 3 separate transactions for a write operation (including a command phase/transaction in which a write command is sent from the host 101 to the destination device, a data transfer phase/transaction in which data is transferred from the memory 102 of the host 101 to the destination device, and a write phase/transaction in which data is written to the memory array 120 of the destination device). Each operation/transaction either consumes bandwidth at system level or CPU cycles of the host 101.

Figure 10:
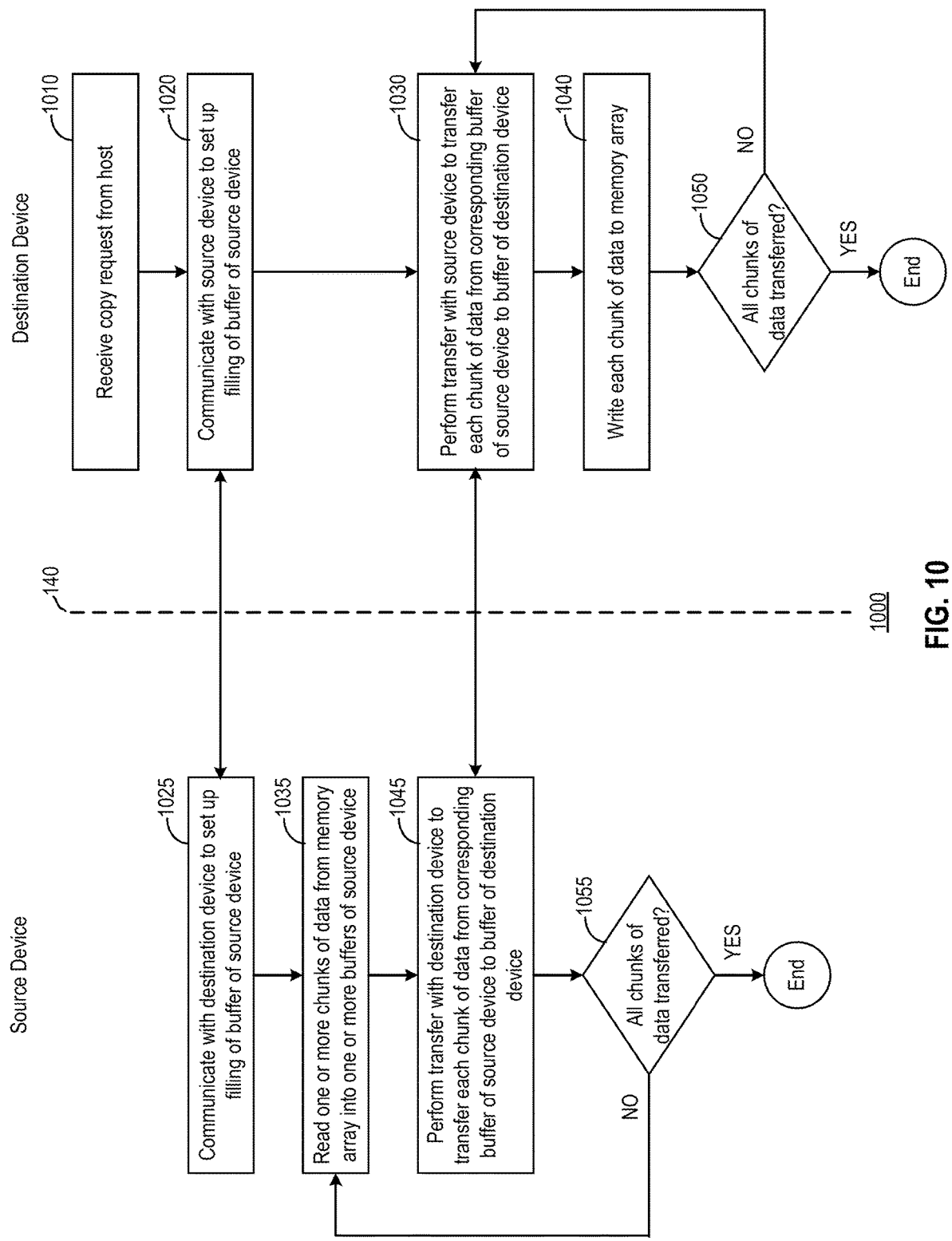
FIG. 10 is a flowchart diagram illustrating an example method for performing data copy, according to some implementations.

FIG. 10 is a block diagram illustrating an example method 1000 for performing data copy, according to some implementations. Referring to FIGS. 1A-10, the method 1000 is performed by a destination device (e.g., the storage device 100b) and a source device 100a. The blocks 1010, 1020, 1030, 1040, and 1050 are performed by the destination device. The blocks 1025, 1035, 1045, and 1055 are performed by the source device. Communications between the source device and the destination device, for example, at blocks 1020/1025 and blocks 1030/1045 are performed via the interface 140 or another suitable communication channel between the source device and the destination device without being routed to the host 101.

At 1010, the destination device (e.g., the controller 110) receives a copy request from the host 101 over the interface 140. For example, the host 101 submits a copy request (e.g., a command such as a P2P NVMe copy request or another suitable request/command) to the destination device. In some examples, such copy request is not a standard NVMe Write request, and is instead a new type of NVMe request to the destination device instructing the destination device to initiate P2P transfer of data and directly fetch chunks of data to be copied from the source device. In other examples, the copy request triggers behaviors of the destination device that are similar to the behaviors triggered by a write command that points to a buffer address of the buffer 112 of the source device instead of the memory 102 of the host 101. In such examples, the destination device may not even distinguish that the buffer address is on another storage device instead of on the host 101.

In some arrangements, the copy request includes descriptors or parameters that define or identify the manner in which data is to be copied. For example, the copy request can include one or more descriptors identifying the address of the buffer 112 of the source device, at least one namespace of the data on the source device (referred to as "source namespace"), at least one start logical address (LBA) of the data on the source device (referred to as "source start LBA"), and the length B of data bytes of the data. In the example in which the host 101 instructs the destination device to copy data from multiple source devices (e.g., in the many-to-one copy operations of the methods 600, 700, and 800), the copy request can include such descriptors for each source device (e.g., each of the storage devices 100a and 100n) from which data is to be transferred to the destination device. The address of the buffer 112 refers to the address of the P2P reserved area 150 of the buffer 112 of the source device.

Examples of the source namespace include but are not limited to, the namespace 210, the namespace 310, the namespace 410, the namespaces 511 and 512, the namespace 610, the namespace 620, the namespace 710, the namespace 720, the namespace 810, the namespace 820, and so on. Examples of the source start LBA include but are not limited to, the start LBA 212, the start LBA 312, the start LBA 412, the start LBA for the namespace 511, the start LBA for the namespace 512, the start LBA 612, the start LBA 622, the start LBA 712, the start LBA 722, the start LBA 812, the start LBA 822, and so on.

In some arrangements, the copy request further includes one or more descriptors identifying at least one namespace of the data on the destination device (referred to as "destination namespace"), at least one start logical address (LBA) of the data on the destination device (referred to as "destination start LBA"). The length B of data bytes of the data is the same for the source device and the destination device. Examples of the destination namespace include but are not limited to, the namespace 220, the namespace 320, the namespace 420, the namespaces 521 and 522, the namespace 630, the namespace 640, the namespace 730, the namespace 740, the namespace 830, the namespace 840, and so on. Examples of the destination start LBA include but are not limited to, the start LBA 222, the start LBA 322, the start LBA 422, the start LBA for the namespace 521, the start LBA for the namespace 522, the start LBA 632, the start LBA 642, the start LBA 732, the start LBA 742, the start LBA 832, the start LBA 842, and so on.

Thus, copy request includes logical address information for both the source device(s) and the destination device. The descriptors included in the copy request are referred to as a source-destination pair descriptor for each copy operation. As described herein, for every copy operations, there is one destination device and one or multiple source devices. Including information for multiple source devices allows for multiple copy operations to be performed for a same destination device as part of a single copy request.

At 1020, the destination device communicates with the source device to set up filling of the buffer 112 of the source device with data identified in the copy request. At 1025, the source device communicates with the destination device to set up filling of the buffer 112 of the source device with data identified in the copy request. In particular, the destination device can identified the data to the source device by sending to the source device the source namespace, the source start LBA, and the length of the data, the descriptors for which are included in the copy request received at 1010. In the examples in which multiple source devices are identified in the copy request, the destination device communicates with each source device to set up filling of the buffer 112 of each source device with data identified in the copy request, in the manner described.

For example, in response to receiving the copy request at 1010, the destination device sends a P2P message to the source device. Thus, block 1020 includes sending, by the destination device, the message to the source device, and block 1025 includes receiving, by the source device, the message from the destination device. The message is sent via the interface 140 directly to the source device, without being routed through the host 101. The message includes at least the source namespace, the source start LBA, and a remaining length of the data (e.g., a remaining number of chunks of the data yet to be transferred to the destination device).

In some implementations, the destination device sends the P2P message to the source device by performing a write operation to write the message to the address of the P2P reserved area 150 of the buffer 112 of the source device. As described, the message includes at least the source namespace, the source start LBA, and a remaining length of the data (e.g., a remaining number of chunks of the data yet to be transferred to the destination device). In some examples, the message further includes the address of the P2P reserved area 160 of the buffer 112 of the destination device, such that the destination device can send messages, responses, and acknowledgement to the source device by performing a write operation to write the message to the P2P reserved area 160 of the buffer 112 of the destination device.

In other implementations, the P2P message is a regular NVMe read command sent by the destination device to the source device, in which case the destination device temporarily switches into operating as a NVMe Initiator for the source device as an NVMe target device, until the NVMe read command is completed.

In response to receiving this message, the source device stages one or more chunks of data corresponding to the source namespace, the source start LBA, and the remaining length of the data into a buffer of the source device. For example, at 1035, the source device reads one or more chunks of the data from the memory array 120 of the source device into one or more buffers. If no chunk of the data has yet been transferred to the destination device, the remaining length of the data would be the entire length of the data.

In some examples, as described with respect to the method 900a, the source device reads one or more chunks of the data from the memory array 120 of the source device into one or more of the PMR buffers 915-917 (e.g., the buffers 154-158) of the source device, for example, using a sliding window mechanism (e.g., in a current window). Within each window, one or multiple ones of the PMR buffers 915-917 are filled.

In other examples, as described with respect to the method 900b, the source device reads one or more chunks of the data from the memory array 120 of the source device into one or more the read buffers 935-937 (e.g., the read buffer 116) of the source device, using a sliding window mechanism (e.g., in a current window). Within each window, one or multiple ones of the read buffers 935-937 are filled.

At 1030, the destination device performs transfer with source device to transfer each chunk of data from corresponding buffer of the source device to a buffer of the destination device. At 1045, the source device performs transfer with destination device to transfer each chunk of data from corresponding buffer of the source device to a buffer of the destination device.

In some examples, as described with respect to the method 900a, the destination device can perform a P2P read operation to read each chunk of data from a corresponding one of the PMR buffers 915-917 (already filled in the current window) into a corresponding one of the write buffers 925-927 of the destination device. For example, in response to determining that one or more of the PMR buffers 915-917 are filled in the current window, the source device sends a P2P response message to the destination device (e.g., by writing the P2P message to the P2P reserved area 160 or by sending regular NVMe command). The P2P response message includes the addresses of the one or more of the PMR buffers 915-917 that are already filled in the current window. The P2P response message further indicates the number of chunks (which is also the number of the one or more of the PMR buffers 915-917) that are ready for transfer in the current window. Then, the destination device can perform a P2P read operation to read each chunk of data in a corresponding one of the one or more of the PMR buffers 915-917 (already filled in the current window) into a corresponding one of the write buffers 925-927 of the destination device using the address of each of the one or more of the PMR buffers 915-917 (already filled in the current window). In some examples, the destination device sends another P2P message to the source device (e.g., by writing the P2P message to the P2P reserved area 160 or by sending regular NVMe command), where such message indicates that the destination device has fetched a chunk of data and update the remaining chunks of data to be transferred.

In some examples, as described with respect to the method 900*b*, the source device can perform a P2P write operation to write each chunk of data from a corresponding one of the read buffers 935-937 (already filled in the current window) into a corresponding one of the PMR buffers 945-947 of the destination device. For example, in response to determining that one or more of the read buffers 935-937 are filled in the current window, the source device sends a P2P response message to the destination device (e.g., by writing the P2P message to the P2P reserved area 160 or by sending regular NVMe command). The P2P response message includes the number of chunks (which is also the number of the one or more of the read buffers 935-937) that are ready for transfer in the current window. In response, the destination device allocates a number of the PMR buffers 945-947 that is the same as the number of chunks that are ready for transfer. Further, the destination device sends another P2P response message to the source device (e.g., by writing the P2P message to the P2P reserved area 150 or by sending regular NVMe command), where such P2P response message includes the addresses of the allocated ones of the PMR buffers 945-947. Then, the source device can perform a P2P write operation to write each chunk of data in a corresponding one of the one or more of the read buffers 935-937 (already filled in the current window) into a corresponding one of the allocated ones of the PMR buffers 945-947 of the destination device using the address of each of the one or more of the PMR buffers 945-947.

In response to determining that transfer of each chunk of data in a window into a buffer (e.g., a write buffer or a PMR buffer) of the destination device has completed, the destination device performs an NVM write operation to write the data from the buffer of the destination device to the memory array 120 of the destination device, at 1040.

Blocks 1035, 1045, and 1030 are operations performed by the source device and the destination device for one window. Thus, at 1050, in response to the destination device determining that all chunks of data have been transferred to the memory array 120 of the destination device (1050:YES), the method 1000 ends for the destination device, and any write buffers or PMR buffers are released by the destination device. On the other hand, in response to the destination device determining that all chunks of data have not been transferred to the memory array 120 of the destination device (1050:NO), the method 1000 returns to block 1030 for the destination device, where one or more chunks of data for a subsequent window are transferred in the manner described herein.

Similarly, at 1055, in response to the source device determining that all chunks of data have been transferred to the destination device (1055:YES), the method 1000 ends for the source device, and any read buffers or PMR buffers are released by the source device. On the other hand, in response to the source device determining that all chunks of data have not been transferred to the destination device (1055:NO), the method 1000 returns to block 1035 for the destination device, where one or more chunks of data for a subsequent window are transferred in the manner described herein. In one examples, the source device can determine that all chunks of data have been transferred to the destination device in response to receiving a P2P message from the source device indicating that 0 chunks of data remains to be transferred.

In some examples, the destination device polls a status of the source device, where the status indicates data being ready to transfer or completion of the read request. In some examples, the polling can be replaced by an interrupt-based architecture, emulating the SQ/CQ pair model, where the destination device is interrupted upon data being ready. In some examples, the destination device sends a message request to the source device for chunks of data to be transferred from the source device. Upon processing the message request, the source device reports the status via a message response to the destination device. If there is at least one more chunk remaining, the message request and the message report would continue to be sent until the destination device determines that all chunks have been transferred from the source device. The final message from destination device includes a transfer length of zero, which informs source device no further chunks need to be transferred.

The method 1000 can be performed between the destination device and each source device of each source-destination pair descriptor in the copy request the destination device received from the host 101. Upon completion of processing all transfers identified in all source-destination pair descriptors, the copy request is completed by the destination device.

In the method 1000, assume that each chunk of data or buffer size is 128 KB, and the total data size is 1 GB, 3 operations are performed by the source device and the destination device per chunk. With 8,192 total chunks, 24,576 operations plus 2 operations (e.g., 24,578 total operations) are performed. In other words, the method 1000 reduces the number of operations by 75%. Given that each operation consumes system bandwidth, CPU cycles, and other resources, the method 1000 thus improves efficiency of data copy without adding hardware cost.

In some examples in which power loss occurs during a copy operation, the destination device, in destination device-driven methods disclosed herein, stores an indicator that indicates how far the copy operation has already progressed in order to resume after the power loss and subsequent power on. Thus, the destination device treats the P2P reserved area 160 as a Power Loss Protected (PLP) region and flush or save its contents to the memory 120 responsive to power loss. In response to determining that power on, the contents are restored back into the P2P reserved area 160 and copy operation resumes from where it left off last. In some examples, the source device is stateless in the sense that it can lose all the prior information relative to the copy operation (e.g., how much data had already been transferred). Thus, the destination device has not acknowledged a chunk of transfer staged by the source device, because of a power loss even interruption, then the destination device will request for that chunk of data again after power on, and transfer operation can resume from that point on. There is no need for the source device to remember that destination device has not acknowledged and stage on its own that chunk of data which had not been acknowledged.

While the method 1000 corresponds to a method driven by the destination device, other methods can be driven by the source device. In other words, other methods include the source receiving the copy request from the host 101 and initiates communication with the destination device to transfer data from the source device to the destination device.

In some implementation, the host 101 sends a copy request to the source device over the interface 140. The copy request specifies a source namespace, a source start LBA, and a length B of data bytes of the data, the address of the destination device (e.g., the address of the P2P reserved area 160 of the buffer 112 of the destination device), a destination namespace, and a destination start LBA. The source device reads the data corresponding to the source namespace, the source start LBA, and the length B of data bytes of the data from the memory array 120 into the dynamically allocated buffers 154-158 of the buffer 152, for example, in a sliding window as described herein. Then, the source device sends a write command to the destination device or sends a P2P message to the destination device (e.g., by writing the P2P message to the address of the P2P reserved area 160 of the buffer 112 of the destination device), the P2P message specifies the destination namespace, the destination start LBA, and the addresses of the allocated ones of the buffers 154-158. The destination device then performs a P2P read operation to read the data stored in the allocated ones of the buffers 154-158 into write buffers of the destination device. The destination device then writes the data from the write buffers of the destination device into the memory array 120 of the destination device. Such operations can be performed for subsequent sliding windows until all chunks of data have been transferred.

In some implementation, the host 101 sends a copy request to the source device over the interface 140. The copy request specifies a source namespace, a source start LBA, and a length B of data bytes of the data, the address of the destination device (e.g., the address of the P2P reserved area 160 of the buffer 112 of the destination device), a destination namespace, and a destination start LBA. The source device reads the data corresponding to the source namespace, the source start LBA, and the length B of data bytes of the data from the memory array 120 into the dynamically allocated read buffers of the read buffer 116, for example, in a sliding window as described herein. Next, the source device performs a P2P write operation to transfer the data from each of the allocated ones of the read buffers of the source device to the buffers 164-168 of the destination device. For example, the source device can send a P2P message to the destination device (e.g., by writing the P2P message to the address of the P2P reserved area 160 of the buffer 112 of the destination device) indicating a number of the buffers 164-168 to be allocated for a sliding window. The destination device can send a P2P message response to the source device (e.g., by writing the P2P message to the address of the P2P reserved area 150 of the buffer 112 of the source device) indicating the addresses of the allocated ones of the buffers 164-168. The source device can perform a P2P write operation to transfer the data from each of the allocated ones of the read buffers of the source device to the allocated ones of the buffers 164-168 of the destination device. The destination device then writes the data from the write buffers of the destination device into the memory array 120 of the destination device. In some examples, the source device can send a write command to the destination device specifying the allocated ones of the buffers 164-168 as data to be written to the memory array 120. Such operations can be performed for subsequent sliding windows until all chunks of data have been transferred. The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of steps in the processes disclosed is an example of illustrative approaches. Based upon design preferences, it is understood that the specific order or hierarchy of steps in the processes may be rearranged while remaining within the scope of the previous description. The accompanying method claims present elements of the various steps in a sample order, and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the steps of various examples must be performed in the order presented. As will be appreciated by one of skill in the art the order of steps in the foregoing examples may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical drive storage, magnetic drive storage or other magnetic storages, or any other medium that may be used to store desired program code in the form of instructions or data structures and that may be accessed by a computer. Drive and disc, as used herein, includes compact disc (CD), laser disc, optical disc, digital versatile disc (DVD), floppy drive, and blu-ray disc where drives usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present disclosure. Various modifications to these examples will be readily apparent to those skilled in the art, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. A method for transferring data from a source device to a destination device, comprising:
   receiving, by the destination device, a copy request from a host;
   sending, by the destination device, a read request to the source device;
   requesting, by the destination device, a status of the source device, wherein requesting includes messages from the destination device indicating to the source device an amount of data to transfer or completion of the read request,
   performing, by the destination device, transfer with the source device to transfer the data from buffers of the source device to buffers of the destination device; and
   writing, by the destination device, the data to a non-volatile storage of the destination device.

2. The method of claim 1, wherein the copy request defines one or more of:
   at least one namespace of the data on the source device;
   at least one start logical address of the data on the source device;
   a length of the data;
   at least one namespace of the data on the destination device; and
   at least one start logical address of the data on the destination device.

3. The method of claim 2, further comprising communicating by the destination device with the source device to set up filling of the buffers of the source device, wherein the source device fills the buffers with chunks of data, and one or more of the chunks of data are transferred simultaneously.

4. The method of claim 3, wherein
   communicating with the source device to set up filling of the buffers of the source device comprises sending, by the destination device, a message to the source device; and
   the message comprises the at least one namespace of the data on the source device, the at least one start logical address of the data on the source device, and the length of the data.

5. The method of claim 4, wherein
   the copy request further defines an address of a reserved area of a buffer of the destination device; and
   sending the message to the source device comprises writing the message to the reserved area of the buffer of the destination device using the address of the reserved area.

6. The method of claim 1, wherein
   the buffers of the source device comprise buffers accessible to the destination device;
   the buffers of the destination device comprise write buffers inaccessible to the source device; and
   performing the transfer with the source device to transfer the data from the buffers of the source device to the buffers of the destination device comprises performing, by the destination device, a read operation to read a chunk of the data in each of the buffers accessible to the destination device into a corresponding one of the write buffers inaccessible to the source device.

7. The method of claim 6, wherein
   the buffers accessible to the destination device are Controller Memory Buffer (CMB) or Persistent Memory Region (PMR) buffers; and
   the destination device comprises the non-volatile storage and a controller operatively coupled to the non-volatile storage.

8. The method of claim 1, wherein
   the buffers of the source device comprise read buffers inaccessible to the destination device;
   the buffers of the destination device comprise buffers accessible to the source device; and
   performing the transfer with the source device to transfer the data from the buffers of the source device to the buffers of the destination device comprises receiving, by the destination device, a chunk of the data in each of the buffers accessible to the source device from a corresponding one of the read buffers inaccessible to the destination device via a write operation performed by the source device.

9. A destination device, comprising:
buffers;
a non-volatile storage; and
a controller configured to:
    receive a copy request from a host;
    send a read request to the source device;
    request a status of the source device, wherein requesting includes messages from the destination device indicating to the source device an amount of data to transfer or completion of the read request;
    perform transfer with a source device to transfer data from buffers of a source device to the buffers of the destination device; and
    write the data to the non-volatile storage.

10. A non-transitory processor-readable media comprising processor-readable instructions, such that, when executed by at least one processor of a controller of a destination device, causes the processor to:
    receive a copy request from a host;
    send a read request to the source device;
    request a status of the source device, wherein requesting includes messages from the destination device indicating to the source device an amount of data to transfer or completion of the read request;
    perform transfer with a source device to transfer data from buffers of a source device to buffers of the destination device; and
    write the data to the non-volatile storage.

11. A method for transferring data from a source device to a destination device, comprising:
    receiving a copy request from a host, and in response to the copy request from the host:
        identifying a plurality of chunks of the data in a memory array of the source device associated with the transferring data;
        performing communications between the source device and the destination device to set up filling of buffers of the source device with the identified chunks of the data from the memory array of the source device; and
        performing, by the source device, transfer with the destination device to transfer the data from buffers of the source device to buffers of the destination device,
    wherein the buffers of the source device comprise buffers accessible to the destination device and the buffers of the destination device comprise write buffers inaccessible to the source device, and
    wherein performing the transfer with the source device to transfer the data from the buffers of the source device to the buffers of the destination device comprises transferring a chunk of the data in each of the buffers accessible to the destination device to a corresponding one of the write buffers inaccessible to the source device via a read operation performed by the destination device.

12. The method of claim 11, wherein
communicating with the destination device to set up filling of the buffers of the source device comprises receiving, by the source device, a message from the destination device; and
    the message comprises at least one namespace of the data on the source device, at least one start logical address of the data on the source device, and a length of the data; and
    the message is written by the destination device to a reserved area of a buffer of the destination device using an address of the reserved area.

13. The method of claim 11, wherein the buffers accessible to the destination device are Controller Memory Buffer (CMB) or Persistent Memory Region (PMR) buffers.

14. The method of claim 11, further comprising reading, by the source device, each chunk of the data from a non-volatile storage of the source device into one of the buffers of the source device.

15. The method of claim 14, wherein
the buffers of the source device comprise buffers accessible to the destination device; or
the buffers of the source device comprise read buffers inaccessible to the destination device.

16. A source device, comprising:
buffers;
a non-volatile storage storing data; and
a controller configured to, in response to a copy request from a host:
    identify a plurality of chunks of the data in the non-volatile storage of the source device associated with a data transfer from the source device to a destination device;
    perform communications between the source device and the destination device to set up filling of the buffers of the source device with the identified chunks of the data in the non-volatile storage; and
    perform transfer with the destination device to transfer the data from the buffers of the source device to buffers of the destination device,
wherein the buffers of the source device comprise buffers accessible to the destination device and the buffers of the destination device comprise write buffers inaccessible to the source device, and
wherein performing the transfer with the source device to transfer the data from the buffers of the source device to the buffers of the destination device comprises transferring a chunk of the data in each of the buffers accessible to the destination device to a corresponding one of the write buffers inaccessible to the source device via a read operation performed by the destination device.

17. A non-transitory processor-readable media comprising processor-readable instructions, such that, when executed by at least one processor of a controller of a source device, causes the processor to:
    receive a copy request from a host, and in response to the copy request from the host:
        identify a plurality of chunks of the data in a memory array of the source device associated with a data transfer from the source device to a destination device;
        perform communications between the source device and the destination device to set up filling of the buffers of the source device with the identified chunks of the data in the non-volatile storage; and
        perform transfer with the destination device to transfer the data from the buffers of the source device to buffers of the destination device,
    wherein the buffers of the source device comprise read buffers inaccessible to the destination device and the buffers of the destination device comprise buffers accessible to the source device, and wherein performing the transfer with the source device to transfer the data from the buffers of the source device to the buffers of the destination device comprises performing, by the source device, a write operation to write a chunk of the data in each of the read buffers inaccessible to the destination device to a corresponding one of the buffers accessible to the source device.

18. The method of claim 11, wherein the copy request from the host includes source and destination descriptors that specify the source device and destination device.

\* \* \* \* \*